United States Patent
Tuffin et al.

(10) Patent No.: US 10,416,518 B2
(45) Date of Patent: Sep. 17, 2019

(54) LIGHT MODULATION ELEMENT

(71) Applicant: MERCK PATENT GMBH, Darmstadt (DE)

(72) Inventors: Rachel Tuffin, Chandler's Ford (GB); Rebecca Proctor, Southampton (GB); Simon Siemianowski, Darmstadt (DE); Karl Skjonnemand, Southampton (GB); Owain Llyr Parri, Ringwood (GB); Geoffrey Luckhurst, Romsey (GB)

(73) Assignee: MERCK PATENT GMBH, Darmstadt (DE)

(*) Notice: Subject to any disclaimer, the term of this patent is extended or adjusted under 35 U.S.C. 154(b) by 39 days.

(21) Appl. No.: 15/106,656

(22) PCT Filed: Nov. 28, 2014

(86) PCT No.: PCT/EP2014/003192
§ 371 (c)(1),
(2) Date: Jun. 20, 2016

(87) PCT Pub. No.: WO2015/090511
PCT Pub. Date: Jun. 25, 2015

(65) Prior Publication Data
US 2017/0003531 A1    Jan. 5, 2017

(30) Foreign Application Priority Data

Dec. 19, 2013 (EP) .................................. 13005919

(51) Int. Cl.
| | | |
|---|---|---|
| C09K 19/02 | (2006.01) | |
| G02F 1/139 | (2006.01) | |
| C09K 19/04 | (2006.01) | |
| C09K 19/20 | (2006.01) | |
| C09K 19/30 | (2006.01) | |
| G02F 1/1341 | (2006.01) | |
| G02F 1/137 | (2006.01) | |

(52) U.S. Cl.
CPC ............ *G02F 1/1393* (2013.01); *C09K 19/04* (2013.01); *C09K 19/2007* (2013.01); *C09K 19/3003* (2013.01); *G02F 1/1341* (2013.01); *C09K 2019/0481* (2013.01); *C09K 2019/3004* (2013.01); *G02F 2001/13706* (2013.01)

(58) Field of Classification Search
CPC ....................... G02F 2001/13706; C09K 19/32
See application file for complete search history.

(56) References Cited

U.S. PATENT DOCUMENTS

| | | | | |
|---|---|---|---|---|
| 5,148,302 | A * | 9/1992 | Nagano | ............... G02B 5/1828 349/201 |
| 2005/0179003 | A1* | 8/2005 | Heckmeier | ....... G02F 1/133711 252/299.01 |
| 2008/0204612 | A1 | 8/2008 | Komitov | |
| 2008/0303376 | A1* | 12/2008 | Jakli | ..................... H01L 41/113 310/311 |

FOREIGN PATENT DOCUMENTS

| | | |
|---|---|---|
| DE | 10112769 A1 | 12/2001 |
| EP | 1215195 A1 | 6/2002 |
| GB | 2387603 A | 10/2003 |
| JP | 2003206485 A | 7/2003 |
| JP | 2010519587 A | 6/2010 |
| WO | 2008104533 A1 | 9/2008 |
| WO | WO 2008104533 A1 * | 9/2008 ........... G02F 1/1337 |

OTHER PUBLICATIONS

Balachandran, R; Physical Review US, American Physical Society, (2013) E88, 032503-1 to 032503-11. (Year: 2013).*
Christian Keith et al., "Nennatic phases of bent-core mesogens", The Royal Society of Chemistry 2010, Soft Matter, 6, 1704-1721. (Year: 2010).*
International Search Report for PCT/EP2014/003192 dated Feb. 20, 2015.
English Abstract of DE101112769, Publication Date: Dec. 20, 2001.
English Abstract of EP1215195, Publication Date: Jun. 19, 2002.
Aziz, N. et al, "Banana-shaped dopants for flexoelectric nematic mixtures," Liquid Crystals, Nov. 2008, vol. 35, No. 11, pp. 1279-1292.
Wild, J. H. et al., "Synthesis and mesomorphic behaviour of wedge-shaped nematic liquid crystals with flexoelectric properties," Liquid Crystals, Jun. 2006, vol. 33, No. 6, pp. 635-644.
Wild, J. H. et al., "Synthesis and Investigation of Nematic Liquid Crystals with Flexoelectric Properties," Chem. Mater., 2005, vol. 17, pp. 6354-6360.
Van Le, K. et al., "Flexoelectric effect in a bent-core mesogen," Liquid Crystals, Oct.-Nov. 2009, vol. 36, No. 10-11, pp. 1119-1124.
Notice for reasons for rejection in corresponding JP appln. 2016-541059 dated Oct. 29, 2018.
Balachandran, R; Physical Review US, American Physical Society, (2013), E88, 032503-1 to 032503-11.

* cited by examiner

*Primary Examiner* — Chanceity N Robinson
(74) *Attorney, Agent, or Firm* — Millen White Zelano and Branigan, PC

(57) ABSTRACT

The invention provides a light modulation element comprising a flexoelectric polarisable liquid-crystalline medium, characterized in that the switching from a boundary state A to a boundary state B comprises a combination of a distinct flexoelectric switching regime and a distinct dielectric switching regime upon application of an electric field. Furthermore, the present invention relates to the use of such a light modulation element in an electro-optical device, i.e. an LCD display device, and electrooptical devices comprising the light modulation element according to the present invention. Moreover, the invention relates to a method of production of the light modulation element according to the present invention.

19 Claims, No Drawings

LIGHT MODULATION ELEMENT

TECHNICAL FIELD

The invention provides a light modulation element comprising a flexoelectric polarisable liquid-crystalline medium, characterized in that the switching from a boundary state A to a boundary state B involves a combination of a flexoelectric switching regime and a dielectric switching regime upon application of an electric field. Preferably the switching from a boundary state A to a boundary state B involves a combination of a distinct flexoelectric switching regime and a distinct dielectric switching regime upon application of an electric field.

Furthermore, the present invention relates to the use of such light modulation elements in an electro-optical device, i.e. in a LCD display devices, and further to electro-optical devices comprising the light modulation element according to the present invention. Moreover, the invention relates to a method of production of the light modulation element according to the present invention.

STATE OF THE ART

Liquid Crystal Displays (LCDs) are widely used to display information. LCDs are used for direct view displays, as well as for projection type displays. The electro-optical mode, which is employed for most displays still, is the twisted nematic (TN)-mode with its various modifications. Besides this mode, the super twisted nematic (STN)-mode, more recently the optically compensated bend (OCB)-mode, the electrically controlled birefringence (ECB)-mode with their various modifications, as e.g. the vertically aligned nematic (VAN), the patterned ITO vertically aligned nematic (PVA)-, the polymer stabilized vertically aligned nematic (PSVA)-mode, the multi domain vertically aligned nematic (MVA)-mode, as well as others, have been increasingly used.

In general, nematic liquid crystal displays (LCD) are operated based on dielectric switching, i.e. the coupling between dielectric anisotropy ($\Delta\varepsilon$) of the liquid crystal and an applied electric field, which gives rise to an electro-optic response. This response is quadratic with the applied field, i.e. it is not polar, and arises from the switching of the liquid crystal molecules by the field. In conventional nematic LCDs, the switching of the liquid crystal molecules takes place in a plane containing the direction of the applied electric field, which means that an electric field is applied across a liquid crystal sandwich cell, will switch the molecules out-of-plane, i.e. in a plane perpendicular to the cell substrates. This kind of switching, however, gives an electro-optic response having a contrast strongly dependent on the viewing angle.

Besides the above-mentioned modes there are also electro-optical modes employing an electrical field substantially parallel to the substrates, respectively the liquid crystal layer, like e.g. the In Plane Switching (short IPS) mode (as disclosed e.g. in DE 40 00 451 and EP 0 588 568) and the Fringe Field Switching (FFS) mode. Especially the latter mentioned electrooptical modes, which have good viewing angle properties and good response times, are increasingly used for LCDs for modern desktop monitors and even for displays for TV and for multimedia applications.

Further to the above-mentioned display modes, new display modes have been proposed exploiting the so-called "flexoelectric" effect.

The flexoelectric effect was first discussed as a liquid crystal analogue to the piezoelectric effect in R. B. Meyer, Phys. Rev. Lett. 1969, 22, 918-921.

Flexoelectricity is the generation of a spontaneous polarization in a liquid crystal due to a deformation of the director, or conversely, the deformation of the director due to an applied electric field, which is also called flexoelectric switching.

Typically, the flexoelectric effect arises from molecules with a shape asymmetry. The first cases to be considered were wedge and banana shaped molecules. Wedge shaped molecules with longitudinal dipoles show spontaneous polarization when splayed. Likewise, banana shaped molecules with transverse dipoles exhibit spontaneous polarization under bend deformation.

In the above cases, the polarization couples to a splay and/or bend deformation. It can be seen from symmetry arguments that the twist deformation cannot give rise to a polarization. Thus, a phenomenological formula for the flexoelectric polarization ($P_f$) can be written as $$P_f = e_1 n (\text{div } n) + e_3 (\text{curl } n) \times n$$

where $e_1$ and $e_3$ are the splay, bend flexoelectric coefficients, and n (div n), and (curl n)×n are the splay and bend vectors respectively.

The flexoelectric effect has a large influence on many phenomena in liquid crystals. Technologically it plays a key role in some novel device applications.

For example, WO 2005/071477 A1 discloses a liquid crystal device comprising a flexoelectric liquid crystal bulk layer, wherein an inhomogeneous electric field in a direction substantially parallel to the substrates is generated by an interdigitated electrode pattern. It is preferred that the average polarization direction in a direction parallel to the substrates in field-off state is orthogonal to the direction in which an electric field is to be generated. In this case, both the rise and the fall times become field-dependent and the total response time is thereby decreased.

Moreover, WO 2008/104533 A1 discloses a hybrid aligned nematic LC mode (HAN). The liquid-crystalline molecules, which are sandwiched between two substrates, align perpendicular to one substrate surface, but parallel to the other substrate surface. This surface orientation is fixing. The two substrates require different alignment layers. In the HAN arrangement, such a deformation is induced caused by the different surface orientations of the liquid-crystalline molecules at the two substrate surfaces and by the elastic forces among the individual liquid-crystalline molecules (due to a continuous transition from parallel to perpendicular orientation across the thickness of the liquid-crystalline molecule layer), so that a flexoelectric polarisation is generated.

If an in-plane field is applied, the liquid-crystalline molecules, or their projection into the display plane will rotate. Due to the flexoelectric polarisation, the direction of rotation of the molecules then depends on the sign of the voltage.

Document WO 2008/104533 A1 further describes arrangements where the electrodes are arranged as in an IPS display and arrangements where an additional base electrode is disposed on the same substrate, as in a fringe-field switching (FFS) display. Moreover, it discloses arrangements where in-plane electrodes or FFS electrodes are optionally disposed on the substrate with parallel orientation of the liquid-crystalline molecules or on the substrate with vertical orientation of the liquid-crystalline molecules. The former is described there as the embodiment for liquid-crystalline media with positive $\Delta\varepsilon$, the latter as the embodiment for liquid-crystalline media with negative $\Delta\varepsilon$.

In addition, there have been many experimental studies of the flexoelectric effect. For example, Takezoe et al. describe in Liquid Crystals, 36, 2009, 1119-1124 an experimental method for the determination of the flexoelectric coefficients. For this purpose, the authors suggested the use of a bent-core compound of the following formula,

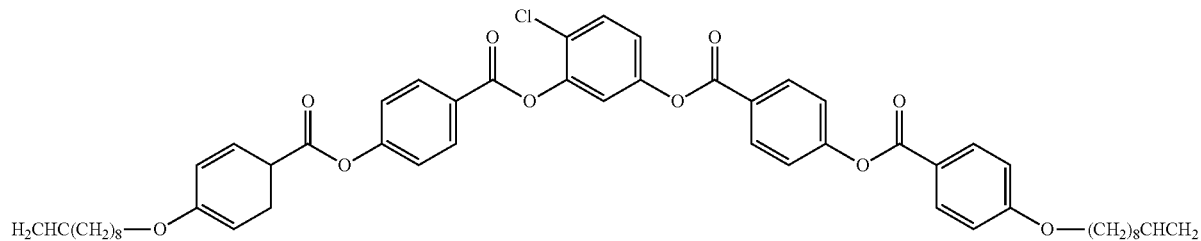

This compound was introduced into a homeotropically aligned cell, which contained two parallel 12 µm thick strips of aluminium foil serving as spacers and electrodes with a gap of 2 mm.

When a DC field was applied transversely through the homeotropic cell, a coupling between the induced flexoelectric polarisation ($P_f$) and an external electric field (E) was observed, which led to the bending deformation of the director, the so-called converse flexoelectric effect.

The relation of the physical parameters involved in this effect can be expressed as $$\delta n = \frac{e_3^2}{K_{33}^2} E^2 n_o \left(1 - \frac{n_o^2}{n_e^2}\right) \frac{d^3}{24},$$

where $\delta n$ is the induced birefringence, $K_{33}$ the bend elastic constant, E the strength of the applied field, d the thickness of the liquid-crystalline medium layer, and $n_o$, $n_e$ are the ordinary and extraordinary refractive indices, respectively.

In order to utilize the converse flexoelectric effect in a light modulation element the following requirements have to be optimized concerning
1. the homeotropic alignment throughout the entire liquid-crystalline medium,
2. the anchoring energies in the vicinity of the glass substrate,
3. the applied electrical field which should be as uniform as possible,
4. the electrode spacing, and concerning
5. the cell thickness.

At the same time, the following requirements on a liquid-crystalline medium have to be satisfied in order to guarantee a good performance of the light modulation element:
1. a suitable high bend flexoelectric coefficient,
2. a suitable ratio of dielectric anisotropy to bend flexoelectric coefficient,
3. a suitable value for the birefringence to increase the retardation for a given director deviation,
4. a suitable rotational viscosity to optimize switching speed, and
5. suitable elastic constants.

A general object of the present invention is to alleviate the above problems and to provide an alternative to the commonly known light modulation elements of the prior art, or preferably, to provide an improved light modulation element.

In particular, an object of the invention is to provide a light modulation element having the capability of generating high contrast and wide viewing angle images and exhibiting a fast in-plane switching, more particularly to reduce the total switching time enabling a satisfactory display of moving images.

Other objects of the present invention are to decrease the driving voltage of the light modulation element, to increase the optical aperture ratio and to increase the transmittance. The improvements of these parameters are in particularly important for portable applications, such as cellular phones.

In view of the numerous requirements and parameters summarized above, surprisingly, the inventors of the present invention have found that the converse flexoelectric effect can be utilized in a light modulation element, which utilizes a combination of flexoelectric and dielectric switching.

Thus, the invention relates to a light modulation element comprising a flexoelectric polarisable liquid-crystalline medium, characterized in that the switching from a boundary state A to a boundary state B involves a combination of a distinct flexoelectric switching regime and a distinct dielectric switching regime upon application of an electric field.

The light modulation element according to the present invention exhibits especially, beside other beneficial properties, the following properties:
a favourable low-cost electrode-structure,
a favourable optical aperture,
a favourable low driving voltage,
a favourable low viewing angle dependence,
a favourable optical extinction and therefore a favourable contrast,
a favourable degree of self-compensation, and
favourable fast switching times.

The invention relates also to a method of production of a light modulation element as described above and below.

The invention further relates to the use of a light modulation element, as described above and below, in liquid crystal displays (LCDs) or other optical or electrooptical devices.

Thus, the invention further relates to an electrooptical device, such as an LCD, comprising at least one light modulation element as described above and below.

TERMS AND DEFINITION

The term "liquid crystal (LC)" relates to materials having liquid-crystalline mesophases in some temperature ranges (thermotropic LCs) or in some concentration ranges in solutions (lyotropic LCs). They obligatorily contain mesogenic compounds.

The terms "mesogenic compound" or "liquid crystal compound" are taken into mean a compound comprising one or more calamitic (rod- or board/lath-shaped) or discotic (disk-shaped) mesogenic group. The term "mesogenic group" means a group with the ability to induce liquid-crystalline phase (or mesophase) behaviour. The compounds comprising mesogenic groups do not necessarily have to exhibit a liquid-crystalline mesophase themselves. It is also possible that they show liquid-crystalline mesophases only in mixtures with other compounds.

A calamitic mesogenic group usually comprises a mesogenic core. The mesogenic core consists of one or more aromatic or non-aromatic cyclic groups, which are connected to each other directly or via linkage groups and optionally comprising terminal groups attached to the ends of the mesogenic core. Optionally, the mesogenic group comprises one or more groups that are laterally attached to the long side of the mesogenic core, wherein these terminal and lateral groups are usually selected e.g. from carbyl or hydrocarbyl groups, polar groups like halogen, nitro, hydroxy, etc.

For the purposes of the present invention, the term "liquid-crystalline medium" is taken to mean a material, which exhibits liquid-crystalline properties under certain conditions. In particular, the term is taken to mean a material, which forms a nematic liquid-crystalline phase under certain conditions. A liquid-crystalline medium may comprise one or more liquid-crystalline compounds and in addition further substances.

The term "alignment" or "orientation" relates to the alignment (orientational ordering) of anisotropic units of material such as small molecules or fragments of big molecules in a common direction named "alignment direction". In an aligned layer of liquid-crystalline material or medium, the liquid-crystalline director coincides with the alignment direction so that the alignment direction corresponds to the direction of the anisotropy axis of the material.

The terms "uniform orientation" or "uniform alignment" of an liquid-crystalline material, for example in a layer of the material, mean that the long molecular axes (in case of calamitic compounds) or the short molecular axes (in case of discotic compounds) of the liquid-crystalline molecules are oriented substantially in the same direction. In other words, the lines of liquid-crystalline director are parallel.

Throughout this application, the alignment of liquid-crystalline layers, unless stated otherwise, is uniform alignment.

The term "planar orientation/alignment", for example in a layer of an liquid-crystalline material, means that the long molecular axes (in case of calamitic compounds) or the short molecular axes (in case of discotic compounds) of the liquid-crystalline molecules are oriented substantially parallel to the main plane of the layer.

The term "homeotropic orientation/alignment", for example in a layer of an liquid-crystalline material, means that the long molecular axes (in case of calamitic compounds) or the short molecular axes (in case of discotic compounds) of the liquid-crystalline molecules are oriented substantially perpendicular to the main plane of the layer.

A flexoelectric polarisable liquid-crystalline medium is taken to mean a liquid-crystalline medium, which has a significant value of at least one of the flexoelectric coefficients $e_1$ and $e_3$, preferably a high value of $e_3$. The bend flexoelectric coefficient $e_3$ can be defined according to R. B. Meyer, Phys. Rev. Lett. 1969, 22, 918-921, as $$e_3 \propto \theta \left(\frac{b}{a}\right)^{\frac{2}{3}} \mu$$

wherein (a>b), (a) is the length of the molecule, (b) is the width of the molecule, (µ) is the traverse component of the dipole moment and (θ) is the opening angle of the molecule. In general, there exist splay deformation, bend deformation and asymmetrical hybrid (splay+bend) deformation.

Typically, compounds showing suitable values for the bend flexoelectric coefficient $e_3$ are compounds having a dipole associated with a bend in the average molecular structure as defined by Helfrich et al. Z. Naturforsch 1970, 26a, p833-835. Examples such molecules are the so-called "bent core" liquid crystals.

The term "bent-core molecule" or "banana-shaped molecule" relates to the three-dimensional shape of molecules, having a non-linear shape and a corresponding opening angle of less than 180°.

For the purposes of the present application, the term boundary state is taken to mean a state in which the transmission reaches a maximum or minimum value and changes no further or virtually no further if no electrical field is applied.

The light modulation element preferably has two boundary states, one, a boundary state A with a corresponding transmission $T_A$ when no electrical field is applied the so-called "off" state, and the other, a boundary state B with a corresponding transmission $T_B$ when an electrical field is applied the so-called "on" state, whereby:

$$T_A < T_B$$

For the purposes of the present application, the term light transmission is taken to mean the passage of electromagnetic radiation in the visible (VIS), near infrared (near-IR, NIR) and UV-A region through the light modulation element. The term light in the present application is correspondingly likewise taken to mean electromagnetic radiation in the visible, near infrared and UV-A region of the spectrum. In accordance with physical definitions usually used, UV-A light, visible light and near infrared light together are taken to mean radiation having a wavelength of 320 to 3000 nm.

For the purposes of the present application, the term in-plane electric field is taken to mean employing a DC electrical field substantially parallel to the substrates, respectively the liquid crystal layer.

The optical retardation ($\delta(\lambda)$) of a liquid-crystalline medium as a function of the wavelength of the incident beam (λ) is given by the following equation:

$$\delta(\lambda) = (2\pi \Delta n \cdot d)/\lambda$$

wherein (Δn) is the birefringence of the liquid-crystalline medium, (d) is the thickness of the layer of the liquid-crystalline medium and λ is the wavelength of light. The wavelength of light generally referred to in this application is 550 nm, unless explicitly specified otherwise.

The birefringence Δn herein is defined as, $$\Delta n = n_e - n_o$$

wherein $n_e$ is the extraordinary refractive index and $n_o$ is the ordinary refractive index, and the average refractive index $n_{av.}$ is given by, $$n_{av.} = [(2n_o^2 + n_e^2)/3]^{1/2}$$

The extraordinary refractive index $n_e$ and the ordinary refractive index $n_o$ can be measured using an Abbe refractometer. The birefringence ($\Delta n$) can then be calculated.

The induced retardation can be written as $$\delta n = n_o \left(1 - \frac{n_o^2}{n_e^2}\right)\left(\frac{e_3^2 E^2 d^3}{24 K_{33}^2}\right)$$

wherein ($n_e$) is the extraordinary refractive index, ($n_o$) is the ordinary refractive index, (d) is the thickness of the layer of the liquid-crystalline medium, $e_3$ is the bend flexoelectric coefficient, $K_{33}$ is the bend In the present application the term "dielectrically positive" is used for compounds or components with $\Delta\varepsilon > 3.0$, "dielectrically neutral" with $-1.5 \leq \Delta\varepsilon \leq 3.0$ and "dielectrically negative" with $\Delta\varepsilon < -1.5$. $\Delta\varepsilon$ is determined at a frequency of 1 kHz and at 20° C. The dielectric anisotropy of the respective compound is determined from the results of a solution of 10% of the respective individual compound in a nematic host mixture. In case the solubility of the respective compound in the host medium is less than 10% its concentration is reduced by a factor of 2 until the resultant medium is stable enough at least to allow the determination of its properties. Preferably, the concentration is kept at least at 5%, however, in order to keep the significance of the results a high as possible. The capacitance of the test mixtures are determined both in a cell with homeotropic and with homogeneous alignment. The cell gap of both types of cells is approximately 20 μm. The voltage applied is a rectangular wave with a frequency of 1 kHz and a root mean square value typically of 0.5 V to 1.0 V; however, it is always selected to be below the capacitive threshold of the respective test mixture.

The dielectric anisotropy ($\Delta\varepsilon$) is defined as ($\varepsilon_\parallel - \varepsilon_\perp$), whereas $\varepsilon_{av.}$ is ($\varepsilon_\parallel + 2\varepsilon_\perp$)/3. The dielectric permittivity of the compounds is determined from the change of the respective values of a host medium upon addition of the compounds of interest. The values are extrapolated to a concentration of the compounds of interest of 100%.

All temperatures, such as, for example, the melting point T(C,N) or T(C,S), the transition from the smectic (S) to the nematic (N) phase T(S,N) and the clearing point T(N,I) of the liquid crystals, are quoted in degrees Celsius. All temperature differences are quoted in differential degrees.

The term "clearing point" means the temperature at which the transition between the mesophase with the highest temperature range and the isotropic phase occurs.

The term "threshold voltage" for the present invention relates to the capacitive threshold (V0), also called the Freedericks threshold, unless explicitly indicated otherwise. In the examples, as generally usual, the optical threshold for 10% relative contrast (V10) may also be indicated.

Throughout this application and unless explicitly stated otherwise, all concentrations are given in weight percent and relate to the respective complete medium. All physical properties have been and are determined according to "Merck Liquid Crystals, Physical Properties of Liquid Crystals", Status November 1997, Merck KGaA, Germany and are given for a temperature of 20° C., unless explicitly stated otherwise.

In case of doubt the definitions as given in C. Tschierske, G. Pelzl and S. Diele, Angew. Chem. 2004, 116, 6340-6368 shall apply.

The ranges of the parameters that are indicated in this application all include the limit values, unless expressly stated otherwise.

Throughout this application, the substituents on the saturated 1,4-substituted ring systems are, unless indicated otherwise, in the trans configuration. The other formulae stand for both configurations and preferably for the trans-configuration The different upper and lower limit values indicated for various ranges of properties in combination with one another give rise to additional preferred ranges.

Throughout the description and claims of this specification, the words "comprise" and "contain" and variations of the words, for example "comprising" and "comprises", mean "including but not limited to", and are not intended to (and do not) exclude other components. On the other hand, the word "comprise" also encompasses the term "consisting of" but is not limited to it.

DETAILED DESCRIPTION

Suitable liquid crystal media in accordance with the present invention are a flexoelectric polarisable upon application of an in-plane electric field.

A suitable liquid-crystalline medium in accordance with the present invention comprises 2 or more, preferably at least 3, particularly preferably at least 4 and very particularly preferably at least 5, different liquid-crystalline compounds. If only 2 liquid-crystalline compounds are employed, their typical concentration ranges from about 70% to 99% by weight of the total mixture.

Preferably, the liquid-crystalline media used in the light modulation element according to the present invention exhibits an absolute value of the bend flexoelectric coefficient $|e_3|$, which is in the range from approximately 1 pCm$^{-1}$ to approximately 60 pCm$^{-1}$, more preferably in the range from approximately 2 pCm$^{-1}$ to approximately 30 pCm$^{-1}$, and most preferably in the range from approximately 3 pCm$^{-1}$ to approximately 20 pCm$^{-1}$.

In a preferred embodiment, the light modulation element according to the present invention comprises a liquid-crystalline medium, which comprises at least one liquid-crystalline compound having a dipole associated with a bend in the average molecular structure and which show suitable high values for the bend flexoelectric coefficient e3.

Suitable bend flexoelectric coefficients |e3| are preferably in the range from approximately 1 pCm$^{-1}$ to approximately 100 pCm$^{-1}$, more preferably in the range from approximately 5 pCm$^{-1}$ to approximately 40 pCm$^{-1}$, most preferably in the range from approximately 13 pCm$^{-1}$ to approximately 18 pCm$^{-1}$.

Molecules, which have a dipole associated with a bend in the average molecular structure, and which show suitable high values for e3 are preferably selected from the so-called bent-core liquid-crystalline compounds.

Suitable bent-core liquid-crystalline compounds are preferably, selected from the group of compounds of formula I,

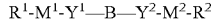   I wherein
$Y^1$ and $Y^2$ are in each case independently —O—, —S—, —CO—, —COO—, —OCO—, —OCO—O—, —CO—NR$^0$—, —NR$^0$—CO—, —OCH$_2$—, —CH$_2$O—, —SCH$_2$—, —CH$_2$S—, —CH=CH—COO—, —OOC—CH=CH— or a single bond,
R$^0$ is H or alkyl with 1 to 4 C atoms, $M^1$ and $M^2$ are independently of each other a mesogenic group, B is a bivalent ring group that imparts a bent structure to the compound, and $R^1$ and $R^2$ denote, each and independently from another, H, F, Cl, CN, OCN, SCN, $SF_5$, NO2 or a straight-chain or branched alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S—, —CH═CH— or —C≡C— in such a manner that oxygen atoms are not linked directly to one another.

The bivalent ring group B in formula I is selected to impart to the inventive compound a bent or banana-shaped structure with a molecular bending angle α as described above. The opening angle imparted to compounds of formula I by the bivalent ring group B is preferably from approximately 90 to approximately 165°, in particular from approximately 105 to approximately 150°, very preferably from approximately 115 to approximately 135°, most preferably from approximately 120 to approximately 130°.

B is preferably a mono- or bicyclic aromatic group that may also contain up to three hetero atoms, and is for example selected from the following groups

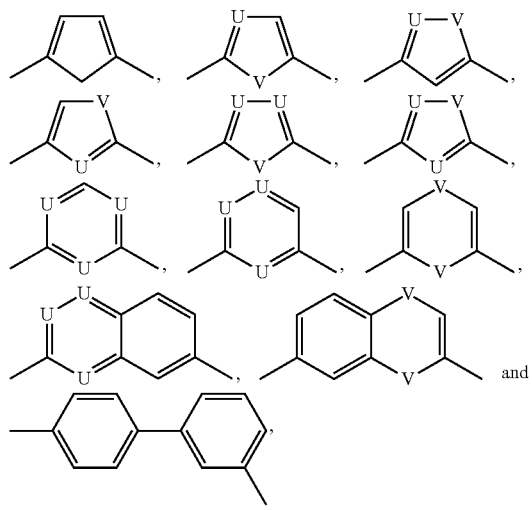

wherein
U is CR' or N,
is $CR'_2$, NR', O or S,
R' is H or alkyl with 1 to 7 C atoms,
and the monocyclic five-membered groups can be substituted with 1, 2 or 3, the monocyclic six-membered groups with 1, 2, 3 or 4 and the bicyclic groups with 1, 2, 3, 4, 5 or 6 groups L, with L being in each case independently F, Cl, CN, SCN, $NO_2$, $SF_5$, alkyl, alkoxy, alkylcarbonyl or alkoxycarbonyl having 1 to 7 C atoms wherein one or more H atoms may be substituted by F or Cl.

Preferably B is selected from the following groups

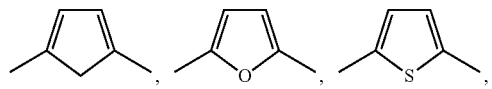

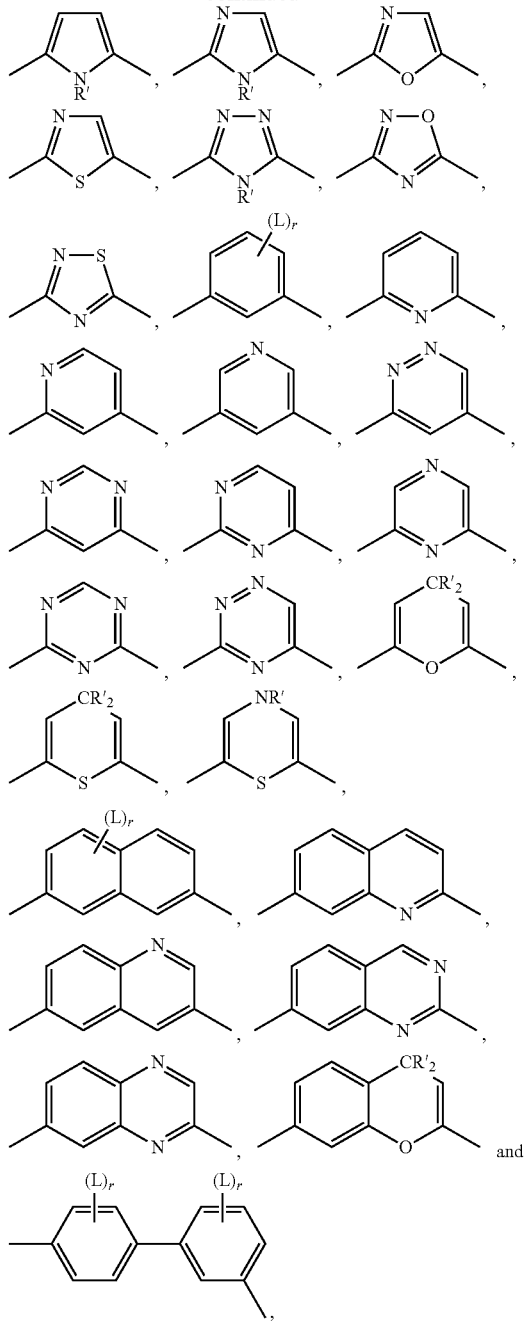

wherein R' and L have one of the meanings given above and r is 0, 1, 2 or 3. Preferably at least one of R' denotes H.

Very preferably B is 1,3-phenylene that is optionally substituted with L in the 4-, 5- and/or 6-position, in particular

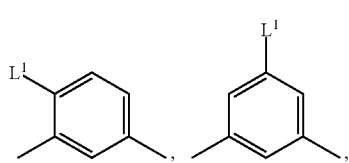

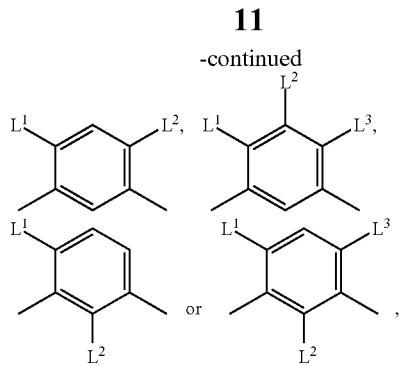

with $L^1$, $L^2$ and $L^3$ preferably selected from F, Cl, CN, OH, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, in particular F, Cl, CN, $CH_3$, $C_2H_5$, $OCH_3$, $COCH_3$, $CF_3$ and $OCF_3$, most preferably F, Cl, CN, $CH_3$, $OCH_3$ and $OCF_3$.

$M^1$ in formula I is preferably selected of formula I*1

$$-A^1-(Z-A^2)_{m1}- \quad \quad I*1$$

wherein

Z is in each case independently —O—, —S—, —CO—, —COO—, —OCO—, —O—COO—, —CO—$NR^0$—, —$NR^0$—CO—, —$OCH_2$—, —$CH_2O$—, —$SCH_2$—, —$CH_2S$—, —$CH_2CH_2$—, —CH=CH—, —C≡C—, —CH=CH—COO—, —OCO—CH=CH— or a single bond, $A^1$ and $A^2$ are each independently 1,4-phenylene in which, in addition, one or more CH groups may be replaced by N, 1,4-cyclohexylene in which, in addition, one or two non-adjacent $CH_2$ groups may be replaced by O and/or S, 1,4-cyclohexenylene, 1,4-bicyclo(2,2,2)octylene, piperidine-1,4-diyl, naphthalene-2,6-diyl, decahydronaphthalene-2,6-diyl, or 1,2,3,4-tetrahydro-naphthalene-2,6-diyl, it being possible for all these groups to be unsubstituted, mono- or polysubstituted with F, Cl, SCN, CN, $NO_2$, $SF_5$ or optionally fluorinated alkyl, alkoxy, alkylcarbonyl or alkoxycarbonyl with 1 to 7 C atoms, $R^0$ has the meaning of formula I, and m1 is 0, 1, 2 or 3.

$M^2$ in formula I is preferably selected of formula I*2

$$-A^1-(Z-A^2)_{m2}- \quad \quad I*2$$

wherein $A^1$, Z and $A^2$ have one of the meanings of formula I*1 and m2 is 0, 1, 2 or 3.

Preferred compounds of formula I are those wherein m1 and m2 are independently of each other 1, 2 or 3. Further preferred are compounds wherein the mesogenic groups $M^1$ and $M^2$ comprise two or three five- or six-membered rings. Especially preferred are compounds wherein one of m1 and m2 is 2 or 3 and the other is 1, 2 or 3, very preferably both m1 and m2 are 2 or 3, in particular 2. Further preferred are compounds wherein m1+m2 is 3, 4, 5 or 6.

Another preferred embodiment relates to compounds wherein at least one radical Z in formula I*1 and/or I*2 denotes —C≡C—. These compounds are especially suitable for uses where highly birefringent materials are needed.

A smaller group of preferred mesogenic groups $M^1$ and $M^2$ is listed below. For reasons of simplicity, Phe in these groups is 1,4-phenylene that may also be substituted by 1 to 4 groups L, with L being F, Cl, CN, SCN, $NO_2$, $SF_5$ or an alkyl, alkoxy, alkylcarbonyl or alkoxycarbonyl group having 1 to 7 C atoms wherein one or more H atoms may be substituted by F or Cl, and Cyc is 1,4-cyclohexylene. Z has one of the meanings of formula I*1. The list comprises the following subformulae as well as their mirror images

| | |
|---|---|
| -Phe- | I*-1 |
| -Cyc- | I*-2 |
| -Phe-Z-Phe- | I*-3 |
| -Phe-Z-Cyc- | I*-4 |
| -Cyc-Z-Cyc- | I*-5 |
| -Phe-Z-Phe-Z-Phe- | I*-6 |
| -Phe-Z-Phe-Z-Cyc- | I*-7 |
| -Phe-Z-Cyc-Z-Phe- | I*-8 |
| -Cyc-Z-Phe-Z-Cyc- | I*-9 |
| -Phe-Z-Cyc-Z-Cyc- | I*-10 |
| -Cyc-Z-Cyc-Z-Cyc- | I*-11 |

Particularly preferred are the subformulae I*-3, I*-4, I*-5, I*-7 and I*-10.

Z is preferably —COO—, —OCO—, —$CH_2CH_2$—, —C≡C— or a single bond.

Very preferably $M^1$ and $M^2$ are selected from the following formulae and their mirror images

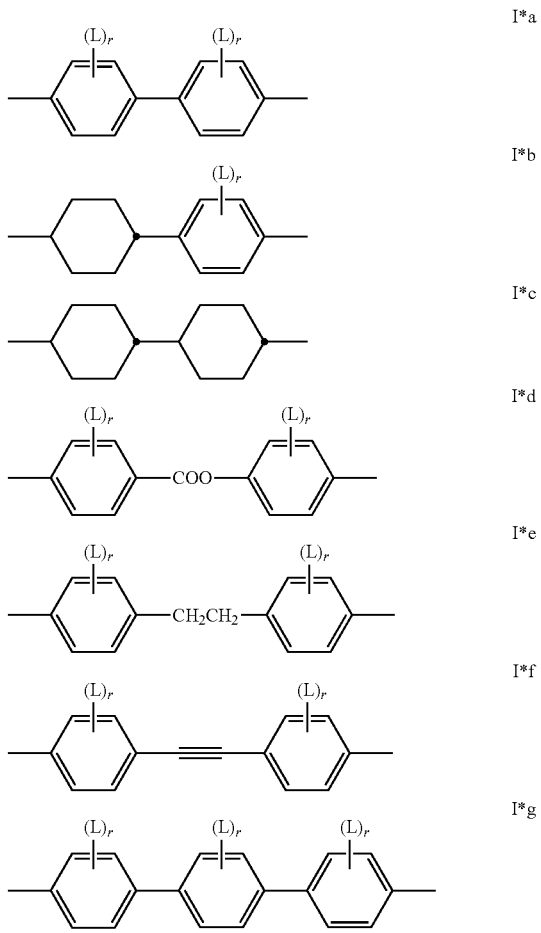

-continued

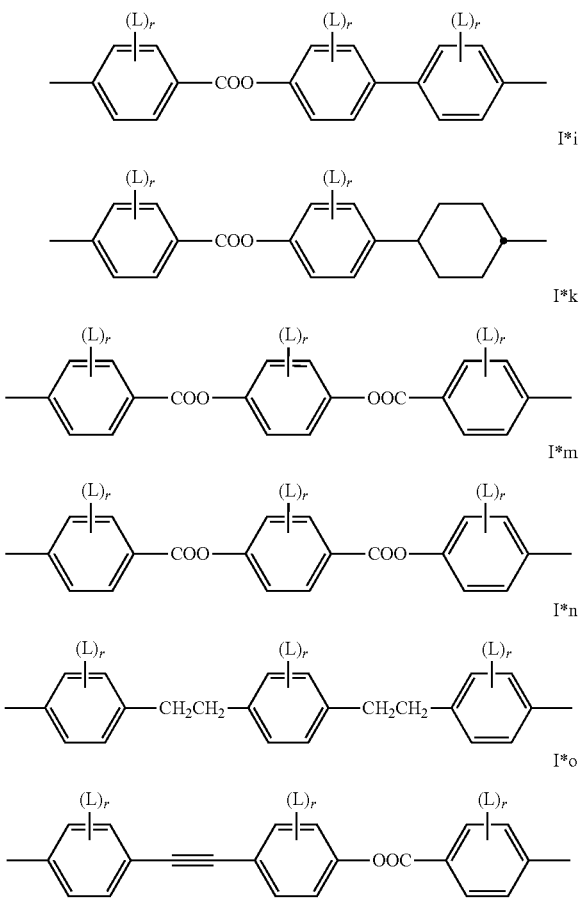

wherein L has the meaning given above and r is 0, 1 or 2.

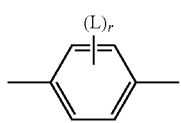

in these formulae is preferably

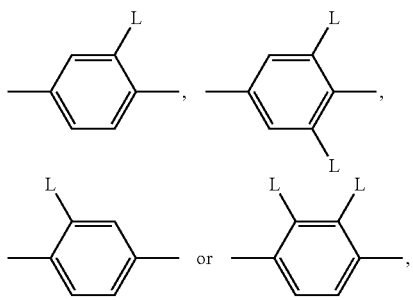

with L having one of the above meanings.

Very preferred are subformulae I*d, I*g, I*h, I*i, I*k and I*o, in particular I*d and I*k.

L is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$, OC$_2$F$_5$, in particular F, Cl, CN, CH$_3$, C$_2$H$_5$, OCH$_3$, COCH$_3$, CF$_3$ and OCF$_3$, most preferably F, Cl, CH$_3$, OCH$_3$ and OCF$_3$.

If R$^1$ or R$^2$ in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Especially preferably, R$^1$ or R$^2$ is straight chain alkyl or alkoxy with 1 to 8 C atoms.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-, 7-, 8- or 9-oxadecyl, for example.

Halogen is F, Cl, Br, I, preferably F or Cl.

R$^1$ or R$^2$ in formula I can be a polar or a non-polar group. In case of a polar group, R is selected from CN, NO$_2$, halogen, OCH$_3$, OCN, SCN, COR$^5$, COOR$^5$ or a mono- oligo- or polyfluorinated alkyl or alkoxy group with 1 to 4 C atoms. R$^5$ is optionally fluorinated alkyl with 1 to 4, preferably 1 to 3 C atoms. Especially preferably polar groups R are selected of F, Cl, CN, NO$_2$, OCH$_3$, COCH$_3$, COC$_2$H$_5$, COOCH$_3$, COOC$_2$H$_5$, CF$_3$, C$_2$F$_5$, OCF$_3$, OCHF$_2$, and OC$_2$F$_5$, in particular of F, Cl, CN, OCH$_3$ and OCF$_3$.

In case of a non-polar group, R$^1$ or R$^2$ is preferably alkyl with up to 15 C atoms or alkoxy with 2 to 15 C atoms.

R$^1$ or R$^2$ in formula I can be an achiral or a chiral group. Preferred chiral groups R$^1$ or R$^2$ are 2-alkyl, 2-alkoxy, 2-methylalkyl, 2-methylalkoxy, 2-fluoroalkyl, 2-fluoroalkoxy, 2-(2-ethin)-alkyl, 2-(2-ethin)alkoxy, 1,1,1-trifluoro-2-alkyl and 1,1,1-trifluoro-2-alkoxy.

Particularly preferred chiral groups R$^1$ or R$^2$ are 2-butyl (=1-methylpropyl), 2-methylbutyl, 2-methylpentyl, 3-methylpentyl, 2-ethylhexyl, 2-propylpentyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl,3-oxa-4-methylpentyl, 4-methylhexyl, 2-hexyl, 2-octyl, 2-nonyl, 2-decyl, 2-dodecyl, 6-methoxyoctoxy, 6-methyloctoxy, 6-methyloctanoyloxy, 5-methylheptyloxy-carbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy, 1,1,1-trifluoro-2-octyloxy, 1,1,1-trifluoro-2-octyl, 2-fluoromethyloctyloxy for example. Very preferred are 2-hexyl, 2-octyl, 2-octyloxy, 1,1,1-trifluoro-2-hexyl, 1,1,1-trifluoro-2-octyl and 1,1,1-trifluoro-2-octyloxy, for example.

In addition, compounds of formula I containing an achiral branched group R$^1$ or R$^2$ may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methyl-propoxy and 3-methylbutoxy.

Preferred compounds of formula I are the following
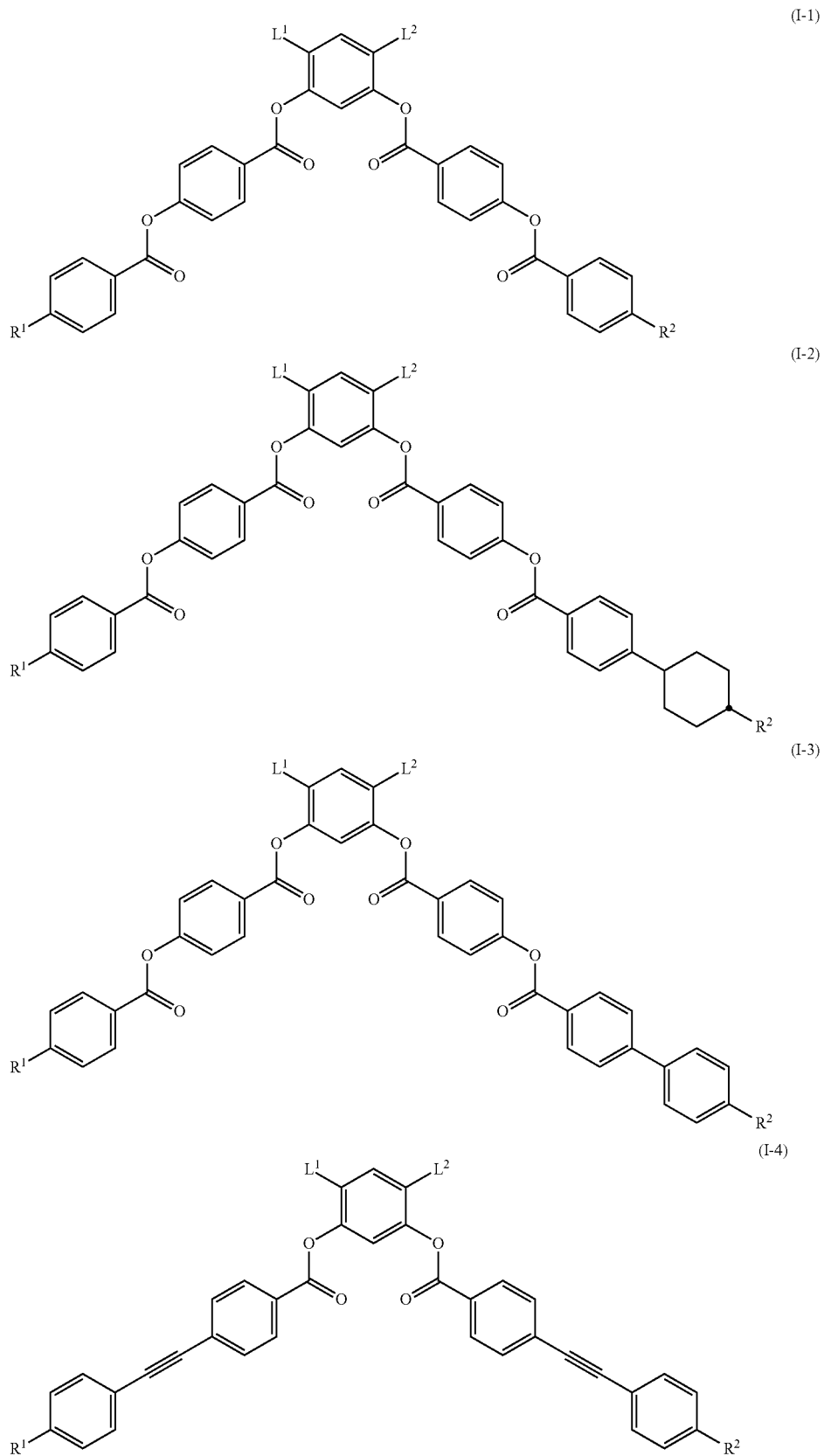

wherein L¹ and L² has each and independently from another one of the meanings of L, R¹ and R² have each and independently and in each occurrence one of the meanings as given above in formula I.

Especially preferred are compounds of the above formulae, wherein L is CN, Cl, F, CF₃ or OCF₃, and R¹ and R² denote a straight chain or branched alkyl or alkoxy with 1 to 15 C atoms.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

In a preferred embodiment, the liquid-crystalline medium comprises one or more dielectrically positive compounds, preferably selected from the group of compounds of formulae II and III,

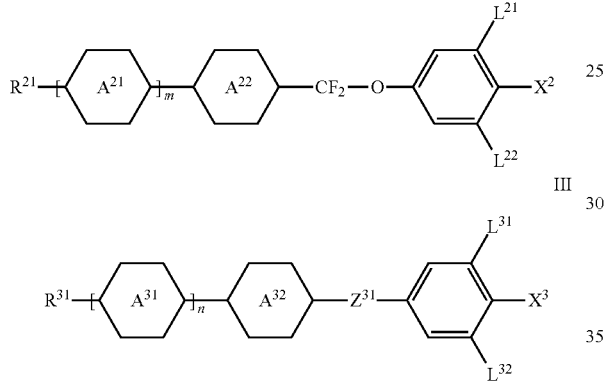

in which
R²¹ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

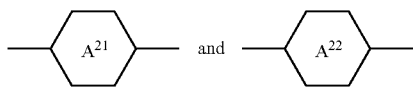

on each appearance, independently of one another, denote

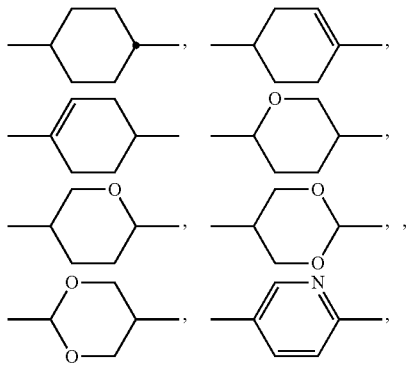

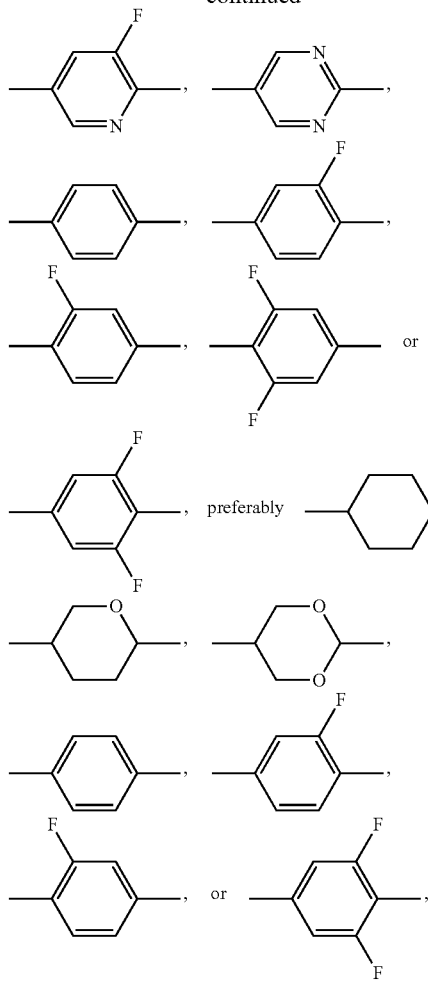

$L^{21}$ and $L^{22}$ denote H or F, preferably $L^{21}$ denotes F, $X^{21}$ denotes halogen, halogenated alkyl or alkoxy having 1 to 3 C atoms or halogenated alkenyl or alkenyloxy having 2 or 3 C atoms, preferably F, Cl, —OCF₃, —O—CH₂CF₃, —O—CH=CH₂, —O—CH=CF₂ or —CF₃, very preferably F, Cl, —O—CH=CF₂ or —OCF₃, m denotes 0, 1, 2 or 3, preferably 1 or 2 and particularly preferably 1, $R^{31}$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms and preferably alkyl or alkenyl,

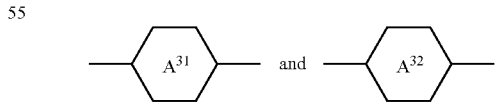

on each appearance, independently of one another, are

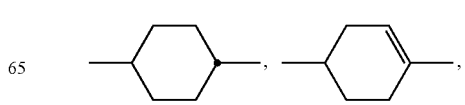

-continued

, preferably

, or

$L^{31}$ and $L^{32}$, independently of one another, denote H or F, preferably $L^{31}$ denotes F,
$X^{31}$ denotes halogen, halogenated alkyl or alkoxy having 1 to 3 C atoms or halogenated alkenyl or alkenyloxy having 2 or 3 C atoms, F, Cl, —OCF$_3$, —O—CH$_2$CF$_3$, —O—CH=CF$_2$, —O—CH=CH$_2$ or —CF$_3$, very preferably F, Cl, —O—CH=CF$_2$ or —OCF$_3$,
$Z^{31}$ denotes —CH$_2$CH$_2$—, —CF$_2$CF$_2$—, —COO—, trans-CH=CH—, trans-CF=CF—, —CH$_2$O— or a single bond, preferably —CH$_2$CH$_2$—, —COO—, trans-CH=CH— or a single bond and very preferably —COO—, trans-CH=CH— or a single bond, and
n denotes 0, 1, 2 or 3, preferably 1 or 3 and particularly preferably 1.

Preferred compounds are selected from the group of compounds of subformulae II-1 and II-2:

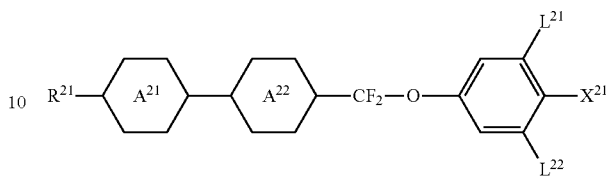

II-1

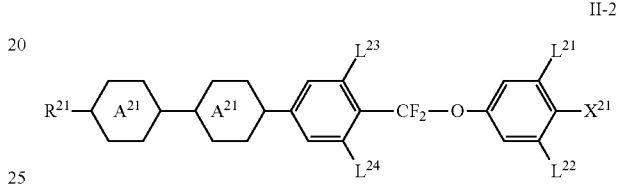

II-2 in which the parameters have the respective meanings indicated above under formula II, and $L^{23}$ and $L^{24}$, independently of one another, denote H or F, preferably $L^{23}$ denotes F, and

has one of the meanings given for

and, in the case of formulae II-1 and II-4, $X^{21}$ preferably denotes F or OCF$_3$, particularly preferably F, and, in the case of formula II-3,

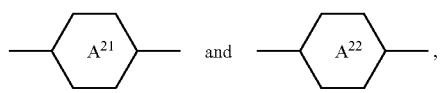

independently of one another, preferably denote

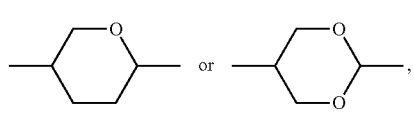

and/or selected from the group of the compounds of the formulae III-1 and III-2:

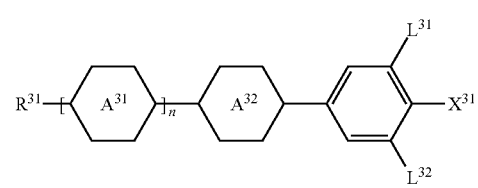

III-1

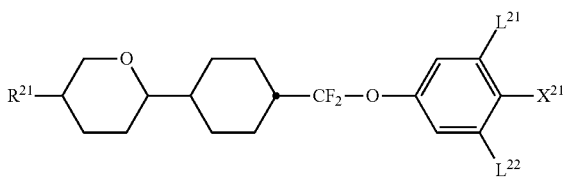

II-1b

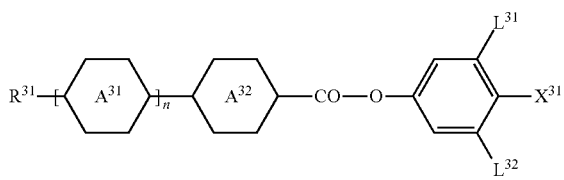

III-2

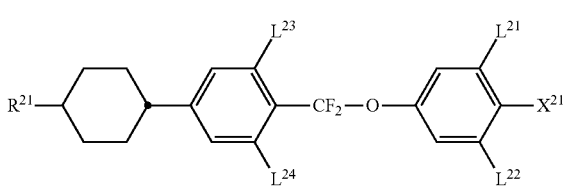

II-1c in which the parameters have the meanings given under formula III.

The media in accordance with the present invention preferably comprise, alternatively or in addition to the compounds of the formulae III-1 and/or III-2, one or more compounds of the formula III-3

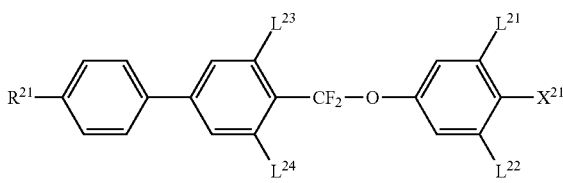

II-1d

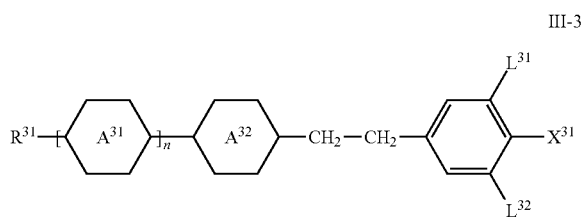

III-3

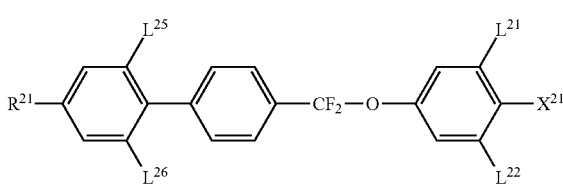

II-1e in which the parameters have the respective meanings indicated above, and the parameters $L^{33}$ and $L^{34}$, independently of one another and of the other parameters, denote H or F.

The liquid-crystal medium preferably comprises compounds selected from the group of the compounds of the formulae II-1 to II-4 in which $L^{21}$ and $L^{22}$ and/or $L^{23}$ and $L^{24}$ both denote F.

In a preferred embodiment, the liquid-crystal medium comprises compounds selected from the group of the compounds of the formulae II-2 and II-3 in which $L^{21}$, $L^{22}$, $L^{23}$ and $L^{24}$ all denote F.

The liquid-crystal medium preferably comprises one or more compounds of the formula II-1. The compounds of the formula II-1 are preferably selected from the group of the compounds of the formulae II-1a to II-1e, preferably of formula II-1d:

in which the parameters have the respective meanings indicated above, and $L^{25}$ and $L^{26}$, independently of one another and of the other parameters, denote H or F, and preferably in the formulae II-1a and II-1b, $L^{21}$ and $L^{22}$ both denote F, in the formulae II-1c and II-1d, $L^{21}$ and $L^{22}$ both denote F and/or $L^{23}$ and $L^{24}$ both denote F, and in formula II-1e, $L^{21}$, $L^{22}$ and $L^{23}$ denote F.

The liquid-crystal medium preferably comprises one or more compounds of the formula II-2, which are preferably selected from the group of the compounds of the formulae II-2a to II-2j, preferably of formula II-2j:

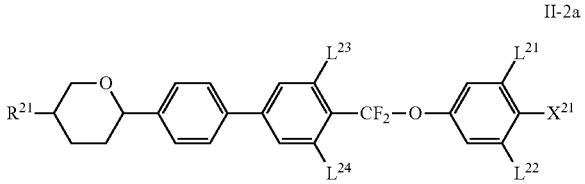

II-2a

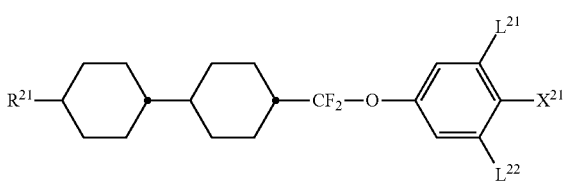

II-1a

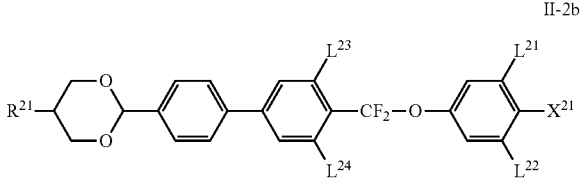

II-2b

-continued

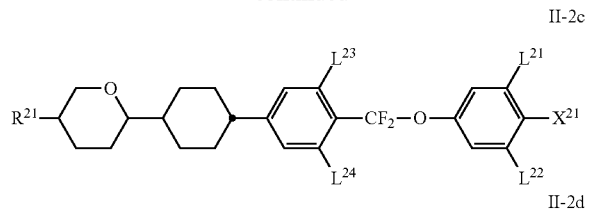
II-2c

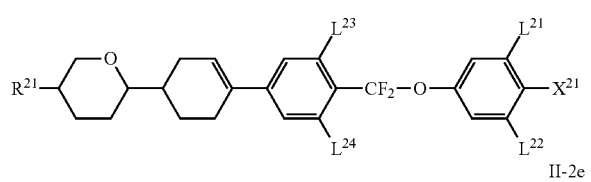
II-2d

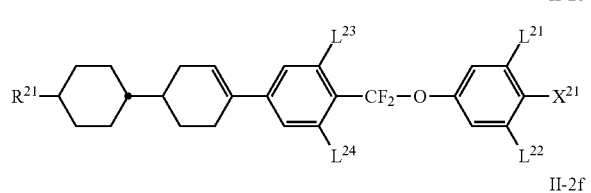
II-2e

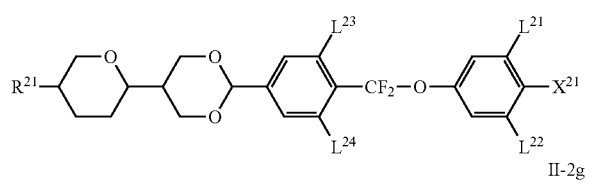
II-2f

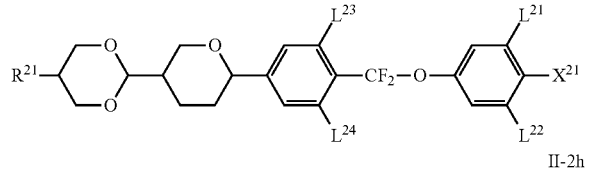
II-2g

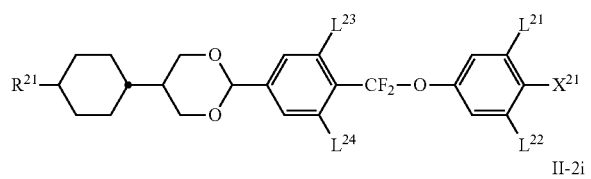
II-2h

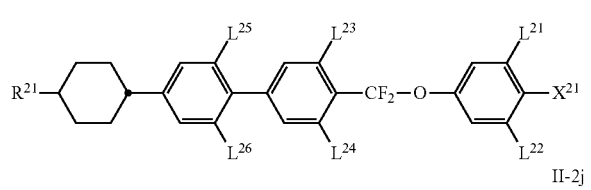
II-2i

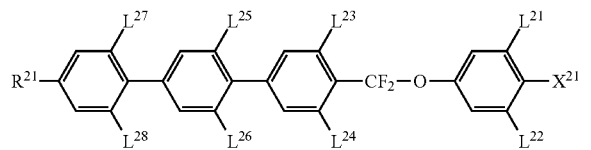
II-2j

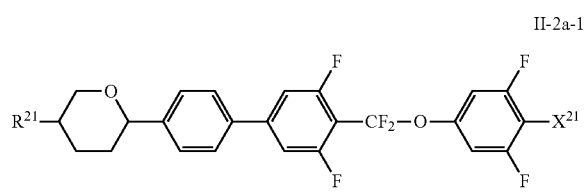

in which the parameters have the respective meanings indicated above, and $L^{25}$ to $L^{28}$, independently of one another, denote H or F, preferably $L^{27}$ and $L^{28}$ both denote H, particularly preferably $L^{26}$ denotes H.

The liquid-crystal medium preferably comprises compounds selected from the group of the compounds of the formulae II-1a to II-1e in which $L^{21}$ and $L^{22}$ both denote F and/or $L^{23}$ and $L^{24}$ both denote F.

In a preferred embodiment, the liquid-crystal medium comprises compounds selected from the group of the compounds of the formulae II-1a to II-1i in which $L^{21}$, $L^{22}$, $L^{23}$ and $L^{24}$ all denote F.

Especially preferred compounds of the formula II-2 are the compounds of the following formulae:

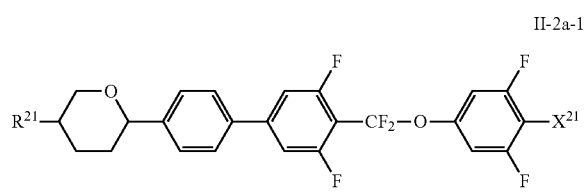
II-2a-1

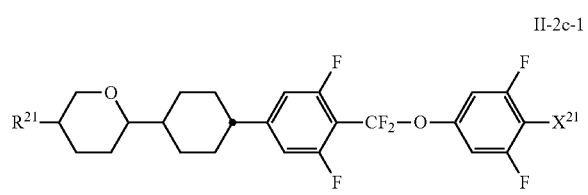
II-2c-1

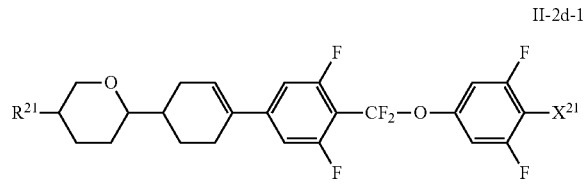
II-2d-1

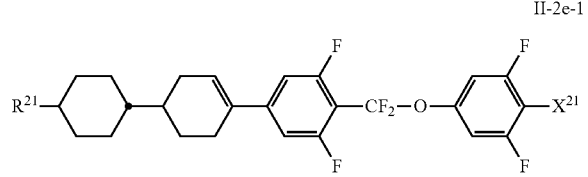
II-2e-1

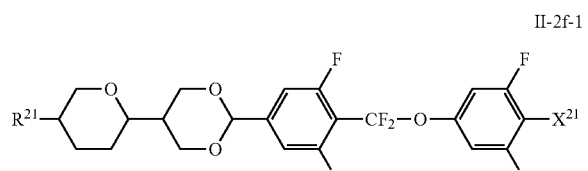
II-2f-1

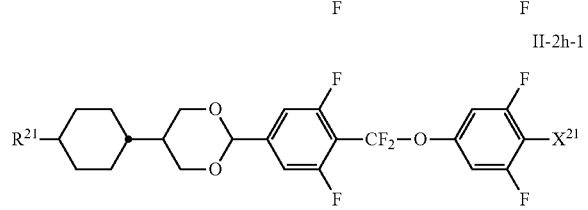
II-2h-1

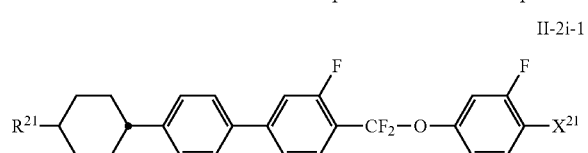
II-2i-1

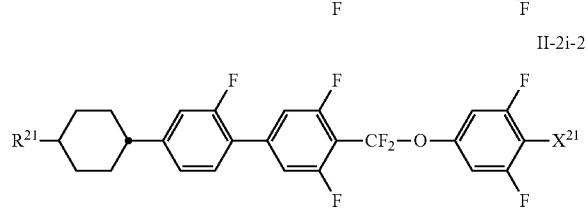
II-2i-2

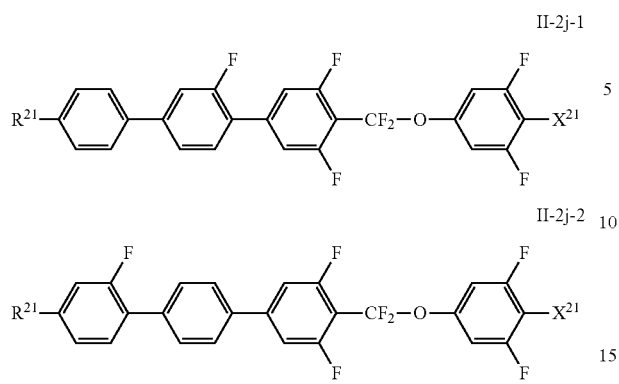

in which $R^{21}$ and $X^{21}$ have the meanings indicated above, and $X^{21}$ preferably denotes F.

The liquid-crystal medium preferably comprises one or more compounds of the formula III-1. Suitable compounds of the formula III-1 are preferably selected from the group of the compounds of the formulae III-1a to III-1j, preferably from formulae III-1c, III-1f, III-1g and III-1j:

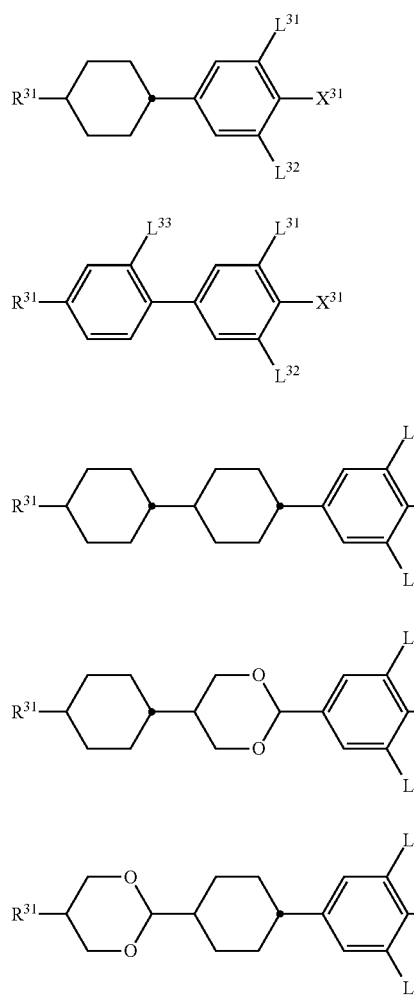

in which the parameters have the meanings given above and preferably in which the parameters have the respective meanings indicated above, and the parameters $L^{35}$ and $L^{36}$, independently of one another and of the other parameters, denote H or F.

The liquid-crystal medium preferably comprises one or more compounds of the formula III-1c, which are preferably selected from the group of the compounds of the formulae III-1c-1 to III-1c-5, preferably of formulae III-1c-3 and III-1c-4:

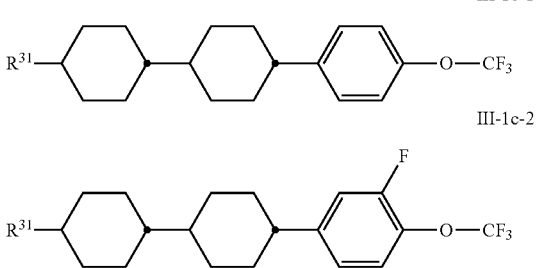

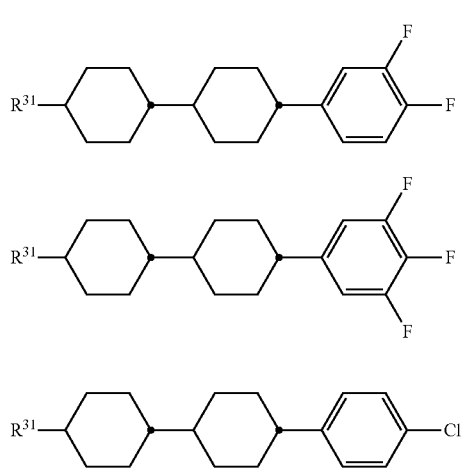

III-1c-3

III-1c-4

III-1c-5 in which R³¹ has the meaning indicated above.

The liquid-crystal medium preferably comprises one or more compounds of the formula III-1f, which are preferably selected from the group of the compounds of the formulae III-1f-1 to III-1f-5, preferably of formulae III-1f-1, III-1 f-2, III-1 f-4 and III-1 f-5, more preferably of formulae III-1f-1, III-1f-4 and III-1f-5, more preferably:

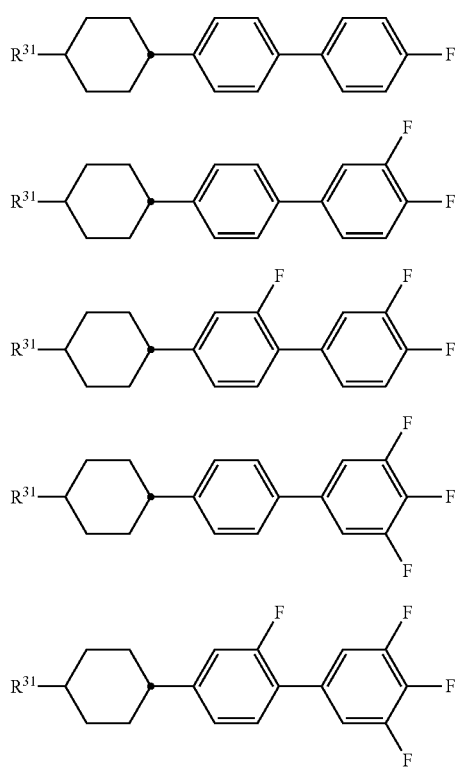

III-1f-1

III-1f-2

III-1f-3

III-1f-4

III-1f-5 in which R³¹ has the meaning indicated above.

The liquid-crystal medium preferably comprises one or more compounds of the formula III-1g, which are preferably selected from the group of the compounds of the formulae III-1g-1 to III-1g-5, preferably of formula III-1g-3:

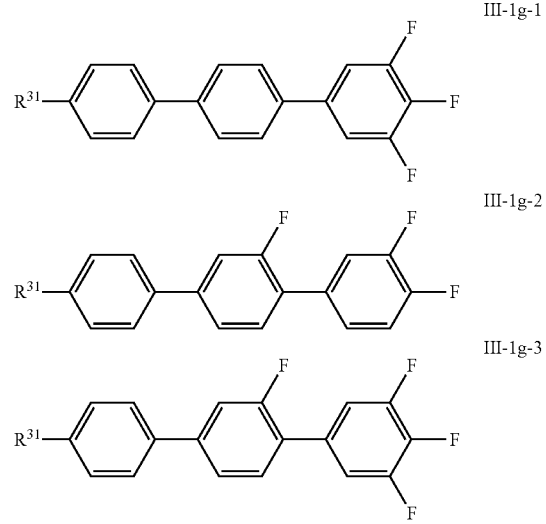

III-1g-1

III-1g-2

III-1g-3

III-1g-4

III-1g-5 in which R³¹ has the meaning indicated above.

The liquid-crystal medium preferably comprises one or more compounds of the formula III-1h, which are preferably selected from the group of the compounds of the formulae III-1h-1 to III-1h-3, preferably of the formula III-1h-3:

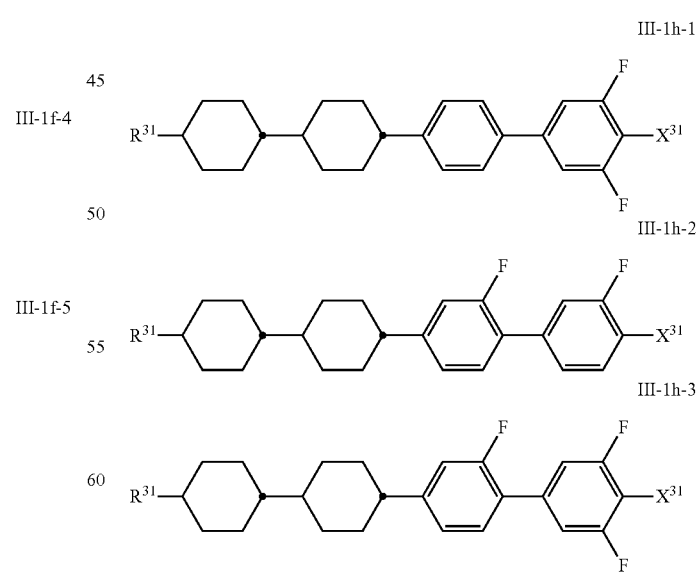

III-1h-1

III-1h-2

III-1h-3 in which the parameters have the meanings given above, and X³¹ preferably denotes F.

The liquid-crystal medium preferably comprises one or more compounds of the formula III-1i, which are preferably selected from the group of the compounds of the formulae III-1i-1 and III-1i-2, preferably of the formula III-1i-2:

III-1i-1

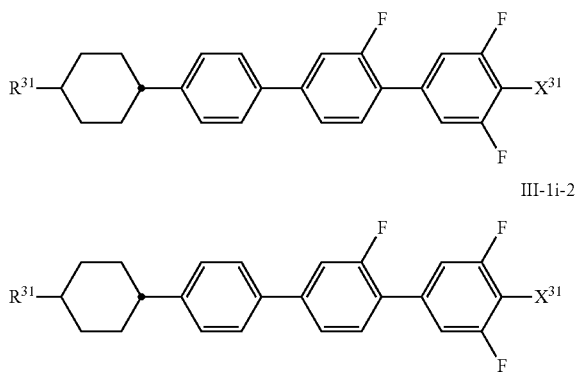

III-1i-2 in which the parameters have the meanings given above, and $X^{31}$ preferably denotes F.

The liquid-crystal medium preferably comprises one or more compounds of the formula III-1j, which are preferably selected from the group of the compounds of the formulae III-1 j-1 and III-1 j-2, preferably of the formula III-1j-1:

III-1j-1

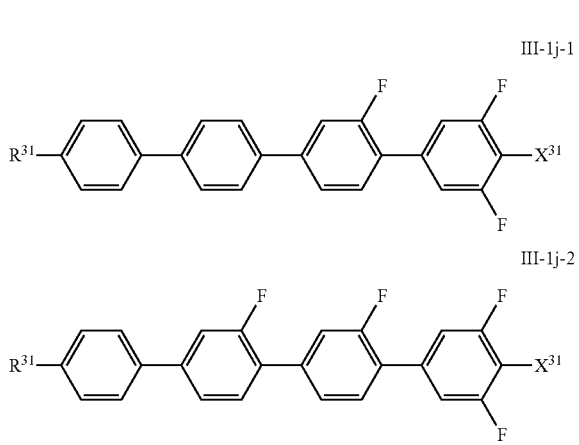

III-1j-2 in which the parameters have the meanings given above.

The liquid-crystal medium preferably comprises one or more compounds of the formula III-2. The compounds of the formula III-2 are preferably selected from the group of the compounds of the formulae III-2a and III-2b:

III-2a

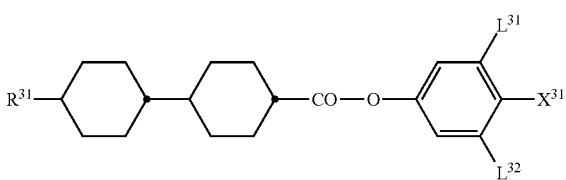

III-2b

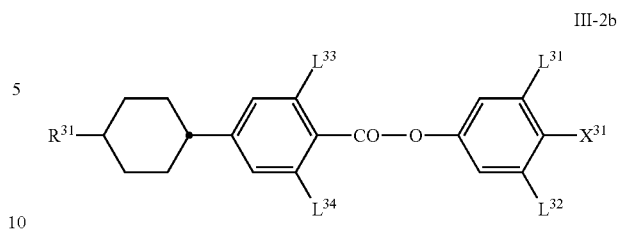

in which the parameters have the respective meanings indicated above, and the parameters $L^{33}$ and $L^{34}$, independently of one another and of the other parameters, denote H or F.

The liquid-crystal medium preferably comprises one or more compounds of the formula III-2a, which are preferably selected from the group of the compounds of the formulae III-2a-1 to III-2a-6:

III-2a-1

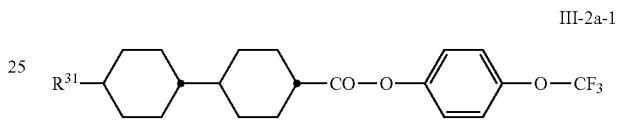

III-2a-2

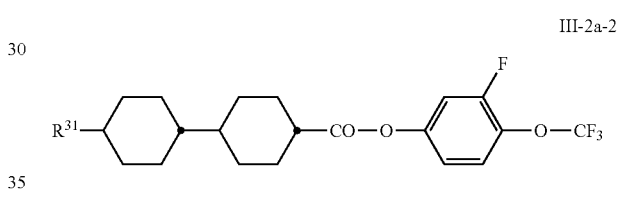

III-2a-3

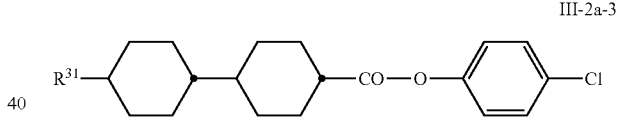

III-2a-4

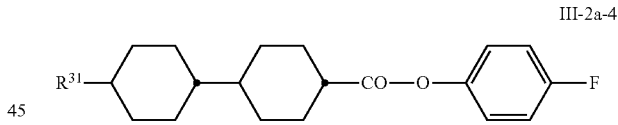

III-2a-5

III-2a-6

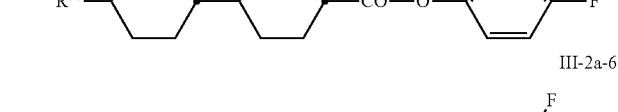

in which $R^{31}$ has the meaning indicated above.

The liquid-crystal medium preferably comprises one or more compounds of the formula III-2b, which are preferably selected from the group of the compounds of the formulae III-2b-1 to III-2b-4, preferably III-2b-4:

III-2b-1

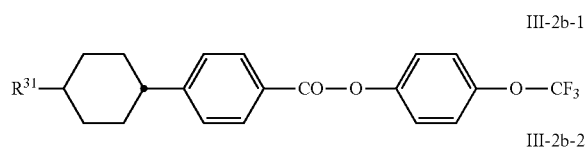

III-2b-2

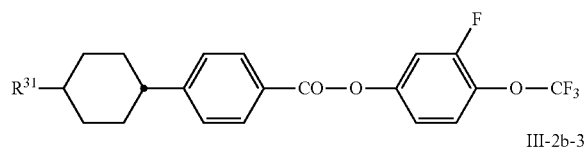

III-2b-3

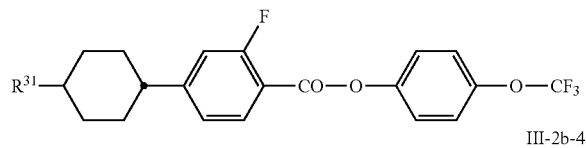

III-2b-4

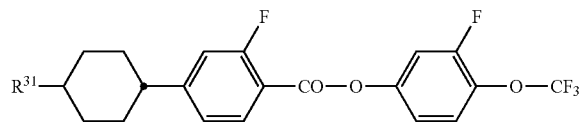

in which $R^{31}$ has the meaning indicated above.

Alternatively or in addition to the compounds of the formulae III-1 and/or III-2, the media in accordance with the present invention preferably comprise one or more compounds of the formula III-3

III-3

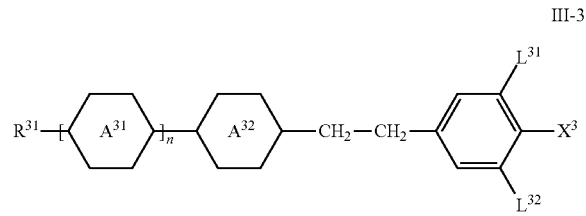

in which the parameters have the respective meanings indicated above under formula III.

These compounds are preferably selected from the group of the formulae III-3a and III-3b:

III-3a

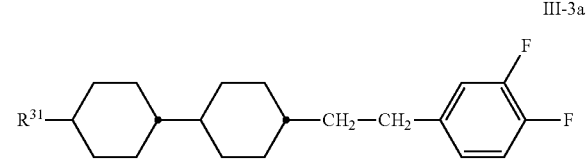

III-3b

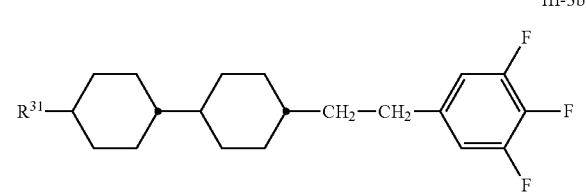

in which $R^{31}$ has the meaning indicated above.

In another preferred embodiment, the liquid-crystalline medium comprises one or more, preferably dielectrically neutral, compounds of the formula IV

IV

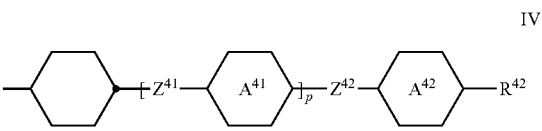

in which $R^{41}$ and $R^{42}$, independently of one another, have the meaning indicated above for $R^{21}$ under formula II, preferably $R^{41}$ denotes alkyl and $R^{42}$ denotes alkyl or alkoxy or $R^{41}$ denotes alkenyl and $R^{42}$ denotes alkyl,

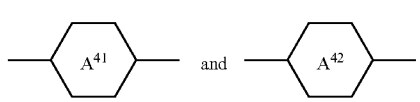

denote independently of one another and, if

occurs twice, also these independently of one another, denote

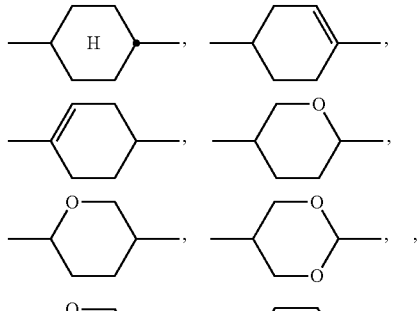

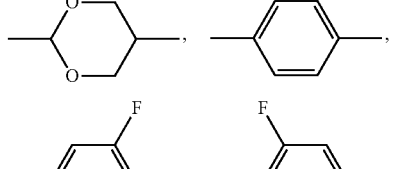

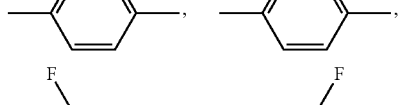

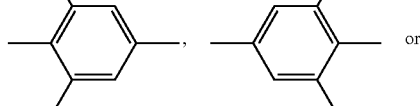

or

preferably one or more of

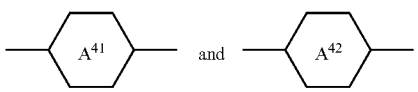

denotes or denote

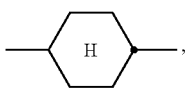

$Z^{41}$ and $Z^{42}$, independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, preferably one or more thereof denotes/denote a single bond, and p denotes 0, 1 or 2, preferably 0 or 1.

The liquid-crystalline media in accordance with the present invention preferably comprise one or more compounds selected from the group of the compounds of the formulae IV-1 to IV-6:

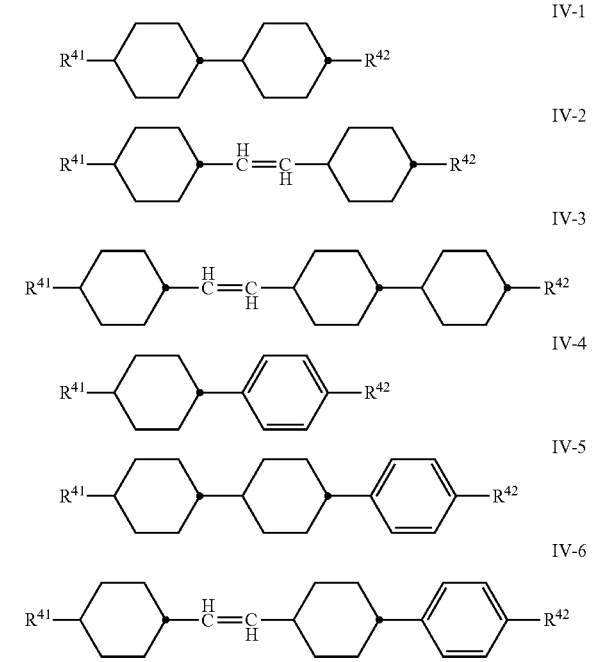

in which $R^{41}$ and $R^{42}$ have the respective meanings indicated above under formula IV, and, in the formulae IV-1, IV-5 and IV-6, $R^{41}$ preferably denotes alkyl or alkenyl, preferably alkenyl, and $R^{42}$ preferably denotes alkyl or alkenyl, preferably alkyl, in formula IV-2, $R^{41}$ and $R^{42}$ preferably denote alkyl, and in formula IV-4, $R^{41}$ preferably denotes alkyl or alkenyl, more preferably alkyl, and $R^{42}$ preferably denotes alkyl or alkoxy, more preferably alkoxy.

The liquid-crystalline media in accordance with the present invention preferably comprise one or more compounds selected from the group of the compounds of the formulae IV-1, IV-4, IV-5 and IV-6, preferably one or more compounds of the formula IV-1 and one or more compounds selected from the group of the formulae IV-4 and IV-5, more preferably in each case one or more compounds of the formulae IV-1, IV-4 and IV-5 and very preferably in each case one or more compounds of the formulae IV-1, IV-4, IV-5 and IV-6.

In a preferred embodiment, the liquid-crystalline media in accordance with the present invention preferably comprise one or more compounds of the formula IV-1, more preferably selected from the respective sub-formulae thereof of the formulae CC-n-m and/or CC-n-Om and/or CC-n-V and/or CC-nV-m and/or CC-Vn-m, more preferably of the formulae CC-n-m and/or CC-n-V and/or CC-nV-m and very preferably selected from the group of the formulae CC-3-1, CC-3-2, CC-3-3, CC-3-4, CC-3-5, CC-3-01, CC-3-V, CC-4-V, CC—S—V and CC-3-V1. The definitions of these abbreviations (acronyms) are evident from Tables A to B.

In a preferred embodiment, the liquid-crystalline media in accordance with the present invention preferably comprise one or more compounds of the formula IV-4, more preferably selected from the respective sub-formulae thereof of the formulae CP-V-n and/or CP-nV-m and/or CP-Vn-m, more preferably of the formulae CP-nV-m and/or CP-V2-n and very preferably selected from the group of the formulae CP-2V-1, CP-1V-2 and CP-V2-1. The definitions of these abbreviations (acronyms) are evident from Tables A and B.

In a preferred embodiment, the liquid-crystalline media in accordance with the present invention preferably comprise one or more compounds of the formula IV-5, more preferably selected from the respective sub-formulae thereof of the formulae CCP-V-n and/or CCP-nV-m and/or CCP-Vn-m, more preferably of the formulae CCP-V-n and/or CCP-V2-n and very preferably selected from the group of the formulae CCP-V-1 and CCP-V2-1. The definitions of these abbreviations (acronyms) evident from Tables A and B.

In a likewise preferred embodiment, the liquid-crystal medium preferably comprises one or more compounds of the formula IV-1, more preferably selected from the respective sub-formulae thereof of the formulae CC-n-m, CC-n-Om, CC-n-V, CC-n-Vm, CC—V—V, CC—V—Vn and/or CC-nV-Vm, more preferably of the formulae CC-n-m and/or CC-n-V and/or CC-n-Vm and very preferably selected from the group of the formulae CC-3-1, CC-3-2, CC-3-3, CC-3-4, CC-3-5, CC-3-01, CC-3-V, CC-4-V, CC-5-V and CC-3-V1 and in particular selected from the group of the formulae CC-3-V, CC-4-V, CC-5-V CC-3-V1, CC-4-V1, CC-5-V1, CC-3-V2 and CC—V-V1. The definitions of these abbreviations (acronyms) are evident from Tables A and B.

In a further preferred embodiment of the present invention, which may be the same as the preceding one or another, the liquid-crystal mixtures in accordance with the present invention comprise the compounds of the formula IV selected from the group of the compounds of the formulae IV-1 to IV-6 as shown above and optionally of the formulae IV-7 to IV-14, preferably of formulae IV-7 and/or IV-14:

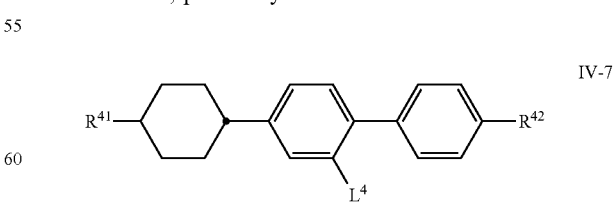

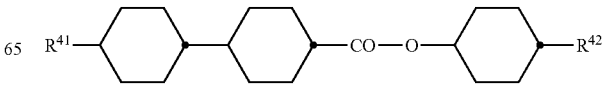

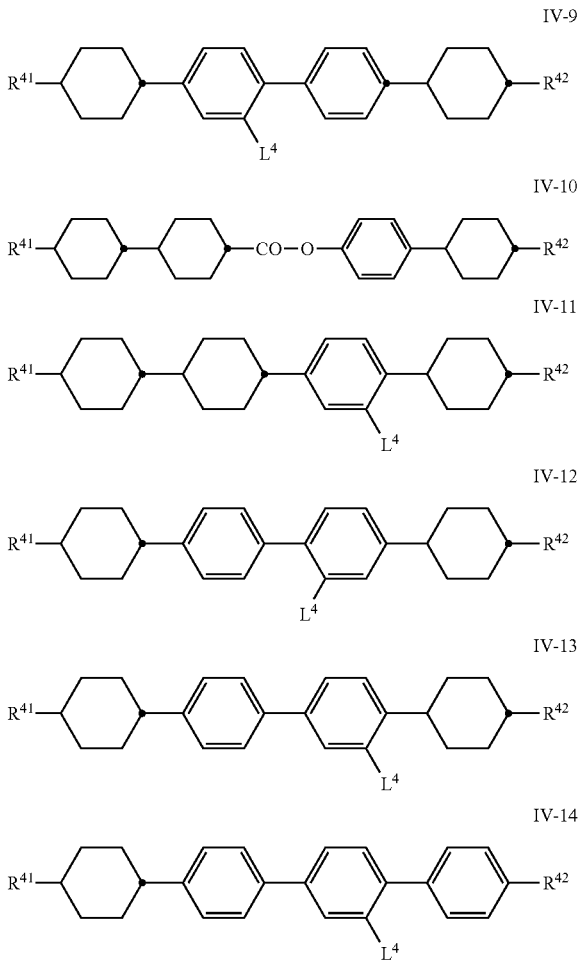

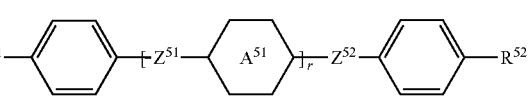

in which
R$^{51}$ and R$^{52}$, independently of one another, have the meanings indicated above for R$^{21}$ under formula II, preferably R$^{51}$ denotes alkyl and R$^{52}$ denotes alkyl or alkenyl,

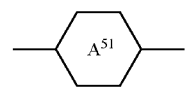

on each appearance, independently of one another, denotes

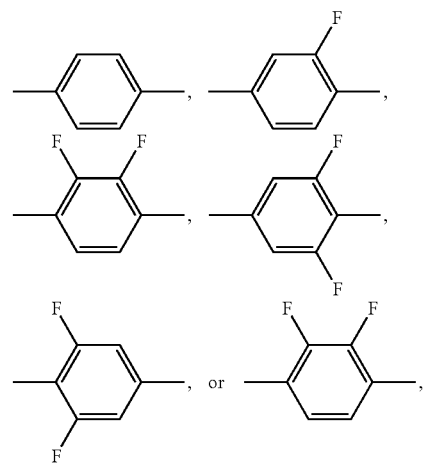

preferably one or more in which

R$^{41}$ and R$^{42}$, independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, and L$^4$ denotes H or F.

In a preferred embodiment, the liquid-crystal medium preferably comprises one or more compounds of the formula IV-7, more preferably selected from the respective sub-formulae thereof of the formulae CPP-3-2, CPP-5-2 and CGP-3-2, more preferably of the formulae CPP-3-2 and/or CGP-3-2 and very particularly preferably of the formula CPP-3-2. The definitions of these abbreviations (acronyms) are evident from Tables A and B.

In a preferred embodiment, the liquid-crystal medium preferably comprises one or more compounds of the formula IV-14, more preferably selected from the respective sub-formulae thereof of the formulae CPGP-3-2, CPGP-5-2 and CPGP-3-4, more preferably of the formulae CPGP-3-2 and/or CPGP-3-2 and very particularly preferably of the formula CPGP-5-2. The definitions of these abbreviations (acronyms) are evident from Tables A and B.

The liquid-crystalline media in accordance with the present invention preferably comprise one or more, preferably dielectrically neutral, compounds of the formula V, Z$^{51}$ and Z$^{52}$, independently of one another and, if Z$^{51}$ occurs twice, also these independently of one another, denote —CH$_2$CH$_2$—, —COO—, trans-CH=CH—, trans-CF=CF—, —CH$_2$O—, —CF$_2$O— or a single bond, preferably one or more thereof denotes/denote a single bond, and r denotes 0, 1 or 2, preferably 0 or 1, particularly preferably 1.

The liquid-crystalline media in accordance with the present invention preferably comprise one or more compounds selected from the group of the compounds of the formulae V-1 and V-2, preferably of formula V-1:

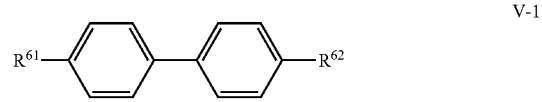

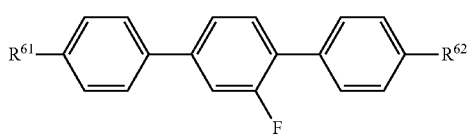

V-2 in which $R^{51}$ and $R^{52}$ have the respective meanings indicated above under formula V, and $R^{51}$ preferably denotes alkyl and in formula V-1, $R^{52}$ preferably denotes alkenyl, preferably —$(CH_2)_2$—CH=CH—$CH_3$, and in formula V-2, $R^{52}$ preferably denotes alkyl, —$(CH_2)_2$—CH=$CH_2$ or —$(CH_2)_2$—CH=CH—$CH_3$.

The liquid-crystalline media in accordance with the present invention preferably comprise one or more compounds selected from the group of the compounds of the formulae V-1 and V-2, in which $R^{51}$ preferably denotes n-alkyl and, in formula V-1, $R^{52}$ preferably denotes alkenyl and, in formula V-2, $R^{52}$ preferably denotes n-alkyl.

In a preferred embodiment, the liquid-crystal medium preferably comprises one or more compounds of the formula V-1, more preferably of the sub-formula PP-n-2Vm thereof, still more preferably of the formula PP-1-2V1. The definitions of these abbreviations (acronyms) are evident from Tables A and B.

In a preferred embodiment, the liquid-crystal medium preferably comprises one or more compounds of the formula V-2, more preferably of the sub-formulae PGP-n-m, PGP-n-2V and PGP-n-2Vm thereof, still more preferably of the sub-formulae PGP-3-m, PGP-n-2V and PGP-n-V1 thereof, very preferably selected from the formulae PGP-3-2, PGP-3-3, PGP-3-4, PGP-3-5, PGP-1-2V, PGP-2-2V and PGP-3-2V. The definitions of these abbreviations (acronyms) are evident from Tables A and B.

The liquid-crystalline media in accordance with the present invention preferably comprise compounds selected from the group of the compounds of the formulae I to V and more preferably of the formulae I to IV, more preferably predominantly consist, still more preferably essentially consist and very preferably completely consist thereof.

Besides the compounds of the formula I, the liquid-crystal mixtures in accordance with the present invention preferably comprise compounds of the formulae II and/or III, preferably of the formula II and of compounds of the formula III. The liquid-crystal mixtures in accordance with the present invention particularly preferably additionally comprise one or more compounds of the formulae IV and/or V, particularly preferably of the formula IV.

The mixtures in accordance with the present invention may of course also comprise in each case one or more compounds of a plurality of the five formulae, formulae I to V, and even all five formulae, formulae I to V.

In this application, comprise in connection with compositions means that the entity in question, i.e. generally the medium, comprises the compound or compounds indicated, preferably in a total concentration of approximately 10% or more and very preferably approximately 20% or more.

In this connection, predominantly consist of means that the entity in question comprises approximately 55% or more, preferably approximately 60% or more and very preferably approximately 70% or more of the compound or compounds indicated.

In this connection, essentially consist of means that the entity in question comprises approximately 80% or more, preferably approximately 90% or more and very preferably approximately 95% or more of the compound or compounds indicated.

In this connection, completely consist of means that the entity in question comprises approximately 98% or more, preferably approximately 99% or more and very preferably 100.0% of the compound or compounds indicated.

Other mesogenic compounds, such as, for example dielectric negative compounds, which are not mentioned explicitly above, can optionally and advantageously also be used in the media in accordance with the present invention. Such compounds are known to the person skilled in the art.

The compounds of formula I are preferably used in a concentration of approximately 3% to approximately 70%, more preferably approximately 5% to approximately 60% and very particularly preferably approximately 10% to approximately 50% of the mixture as a whole.

The compounds of the formulae II and III are preferably used in a concentration of approximately 2% to approximately 90%, more preferably approximately 3% to approximately 80% and very particularly preferably approximately 4% to approximately 70% of the mixture as a whole.

The compounds of the formulae IV and V are preferably used in a concentration of approximately 2% to approximately 70%, more preferably approximately 5% to approximately 65%, even more preferably approximately 10% to approximately 60% and very particularly preferably from approximately 10%, preferably from approximately 15%, to approximately 55% of the mixture as a whole.

The media according to the invention may optionally comprise further liquid-crystal compounds in order to adjust the physical properties. Such compounds are known to the person skilled in the art. Their concentration in the media in accordance with the present invention is preferably 0% to approximately 30%, more preferably approximately 0.1% to approximately 20% and very preferably approximately 1% to approximately 15%.

The liquid-crystal media preferably comprise in total approximately 50% to 100%, more preferably approximately 70% to 100% and very preferably approximately 80% to 100% and in particular approximately 90% to 100% preferably predominantly consist of and very preferably entirely consist of one or more of the compounds of the formulae I, II, III, IV and V, preferably of the formulae I, II, III and IV or V.

In the following conditions for the liquid-crystalline media according to preferred embodiments of the present invention are given. These preferred conditions may be fulfilled individually or, preferably in combinations with each other. Binary combinations thereof are preferred, whereas ternary or higher combinations thereof are particularly preferred.

The liquid-crystalline medium in accordance with the present invention optionally comprises further compounds, for example stabilisers, antioxidants, and/or as mentioned above self-alignment agents. They are preferably employed in a concentration of 0% to approximately 30%, particularly preferably 0% to approximately 15%, and very particularly preferably 0% to approximately 5%.

In accordance with the invention, the liquid-crystalline medium preferably exhibits positive values for the dielectric anisotropy $\Delta\varepsilon$. In this case, $\Delta\varepsilon$ preferably has a value of approximately ≤3, more preferably approximately ≤5, even more preferably approximately ≤8.

The liquid-crystal media in accordance with the present invention preferably have a clearing point of approximately 65° C. or more, more preferably approximately 70° C. or more, still more preferably 80° C. or more, particularly preferably approximately 85° C. or more and very particularly preferably approximately 90° C. or more.

The nematic phase of the media according to the invention preferably extends at least from approximately 0° C. or less to approximately 65° C. or more, more preferably at least from approximately 20° C. or less to approximately 70° C. or more, very preferably at least from approximately 30° C. or less to approximately 70° C. or more and in particular at least from approximately 40° C. or less to approximately 90° C. or more. In individual preferred embodiments, it may be necessary for the nematic phase of the media according to the invention to extend to a temperature of approximately 100° C. or more and even to approximately 110° C. or more.

The Δn of a suitable liquid-crystal media is preferably as high as possible. Typically, the Δn of the liquid-crystal media in accordance with the present invention, at 589 nm (NaD) and 20° C., is preferably in the range from approximately 0.10 or more to approximately 0.35 or more, more preferably in the range from approximately 0.12 or more to approximately 0.35 or more, even more preferably in the range from approximately 0.15 or more to approximately 0.35 or more and very particularly preferably in the range from approximately 0.17 or more to approximately 0.35 or more.

The liquid-crystal media used in the light modulation element according to the present invention preferably have an elastic constant $K_{11}$ of approximately 18 pN or more, more preferably of approximately 20 pN or more, and even more preferably of approximately 25 pN or more.

The liquid-crystal media used in the light modulation element according to the present invention preferably have an elastic constant $K_{33}$ of approximately 30 pN or less, more preferably of approximately 15 pN or less, and even more preferably of approximately 10 pN or less.

The rotational viscosity of a suitable liquid-crystal media is preferably as low as possible. Typically, the media according to the present invention, exhibit a rotational viscosity of approximately 90 mPas or less, preferably of approximately 80 mPas or less.

The liquid-crystal media utilized in the light modulation element according to the present invention are prepared in a manner conventional per se. In general, the desired amount of the components used in lesser amount is dissolved in the components making up the principal constituent, preferably at elevated temperature. It is also possible to mix solutions of the components in an organic solvent, for example in acetone, chloroform or methanol, and to remove the solvent again, for example by distillation, after thorough mixing. It is furthermore possible to prepare the mixtures in other conventional manners, for example using pre-mixes, for example homologue mixtures, or using so-called "multi-bottle" systems.

The functional principle of the device according to the invention will be explained in detail below. It is noted that no restriction of the scope of the claimed invention, which is not present in the claims, is to be derived from the comments on the assumed way of functioning.

In a preferred embodiment of the invention, the light modulation element comprises two or more polarisers, at least one of which is arranged on one side of the layer of the liquid-crystalline medium and at least one of which is arranged on the opposite side of the layer of the liquid-crystalline medium. The layer of the liquid-crystalline medium and the polarisers here are preferably arranged parallel to one another.

The polarisers can be linear polarisers. Preferably, precisely two polarisers are present in the light modulation element. In this case, it is furthermore preferred for the polarisers either both to be linear polarisers. If two linear polarisers are present in the light modulation element, it is preferred in accordance with the invention for the polarisation directions of the two polarisers to be crossed.

It is furthermore preferred in the case where two circular polarisers are present in the light modulation element for these to have the same polarisation direction, i.e. either both are right-hand circular-polarised or both are left-hand circular-polarised.

The polarisers can be reflective or absorptive polarisers. A reflective polariser in the sense of the present application reflects light having one polarisation direction or one type of circular-polarised light, while being transparent to light having the other polarisation direction or the other type of circular-polarised light. Correspondingly, an absorptive polariser absorbs light having one polarisation direction or one type of circular-polarised light, while being transparent to light having the other polarisation direction or the other type of circular-polarised light. The reflection or absorption is usually not quantitative; meaning that complete polarisation of the light passing through the polariser does not take place.

For the purposes of the present invention, both absorptive and reflective polarisers can be employed. Preference is given to the use of polarisers, which are in the form of thin optical films. Examples of reflective polarisers which can be used in the light modulation element according to the invention are DRPF (diffusive reflective polariser film, 3M), DBEF (dual brightness enhanced film, 3M), DBR (layered-polymer distributed Bragg reflectors, as described in U.S. Pat. No. 7,038,745 and U.S. Pat. No. 6,099,758) and APF (advanced polariser film, 3M).

Examples of absorptive polarisers, which can be employed in the light modulation elements according to the invention, are the Itos XP38 polariser film and the Nitto Denko GU-1220DUN polariser film. An example of a circular polariser, which can be used in accordance with the invention, is the APNCP37-035-STD polariser (American Polarizers). A further example is the CP42 polariser (ITOS).

In a preferred embodiment of the invention, the layer of the liquid-crystalline medium is arranged between two substrate layers.

In accordance with the invention, the two substrate layers may consist, inter alia, each and independently from another of a polymeric material, of metal oxide, for example ITO and of glass, preferably each and independently of another of glass and/or ITO, in particular glass/glass.

In a preferred embodiment, the substrates are arranged with a separation in the range from approximately 1 µm to approximately 50 µm from one another, preferably in the range from approximately 2 µm to approximately 40 µm from one another, and more preferably in the range from approximately 3 µm to approximately 30 µm from one another. The layer of the liquid-crystalline medium is thereby located in the interspace.

The substrate layers can be kept at a defined separation from one another, for example, by spacers or electrodes, which extend through the full cell thickness or projecting structures in the layer. Typical spacer materials are commonly known to the expert, as for example spacers made of plastic, silica, epoxy resins, etc.

The light modulation element may furthermore have one or more alignment layers, which are in direct contact with the layer of the liquid-crystalline medium, and preferably induce a homeotropic alignment throughout the entire liquid-crystalline medium. The alignment layers may also serve as substrate layers, so that substrate layers are not necessary in the light modulation element. If substrate layers are additionally present, the alignment layers are in each case arranged between the substrate layer and the layer of the liquid-crystalline medium. Typical alignment layer materials are commonly known to the expert, such as, for example, layers made of polyimide, alkoxysilanes, alkyltrichlorosilanes, CTAB, and chromium based Werner complexes, such as, for example, commercially available Quilon©C from Zaclon.

It is likewise possible in accordance with the present invention and advantageous under certain conditions for the light modulation element to comprise no alignment layers adjacent to the layer of the liquid-crystalline medium. In this case, a homeotropical alignment can be achieved by adding to the liquid-crystalline medium one or more so called "self alignment agents". Suitable self alignment agents are, for example, described by Shie-Chang Jeng et al. Optics Letters (2009), 34, 455-457 or Shug-June Hwang et al. J. Phys D. Appl. Phys 2009, 42, 025102 or the self alignment agents disclosed in US 2008/0198301, JP 2010-170090 A, EP 2 593 529 A1 or EP 2 606 101 A1.

The light modulation element may furthermore comprise filters, which block light of certain wavelengths, for example, UV filters. In accordance with the invention, further functional layers commonly known to the expert may also be present, such as, for example, protective films and/or compensation films.

In a preferred embodiment, the light modulation element comprises a pattern of parallel electrodes, which are capable to allow the application of an electric field, which is substantially parallel to the substrates or the liquid-crystal layer.

Depending on the utilized electrode structure, preferably both substrates carry patterns of opposing electrodes on their facing surfaces with the intervening liquid crystal medium there between. A suitable electrode structures is, for example, a comb-like electrode arrangement. Further preferred electrode structures are, for example, IPS, or FFS electrode structures.

In another preferred embodiment, a through cell electrode structure is utilized, which serves as both spacer and electrode. Other suitable electrode structures are commonly known to the expert.

Suitable electrode materials are commonly known to the expert, as for example electrodes made of metal or metal oxides, such as, for example transparent indium tin oxide (ITO), which is preferred according to the present invention.

The spacing between the electrodes is preferably in the range from approximately 1 μm to approximately 1000 μm, more preferably in the range from approximately 10 μm to approximately 1000 μm, and even more preferably in the range from approximately 20 μm to approximately 1000 μm, in particular in the range from approximately 30 μm to approximately 200 μm.

Preferably, the electrodes of the light modulation element are associated with a switching element, such as a thin film transistor (TFT) or thin film diode (TFD).

The light transmission of the device according to the invention is dependent on the applied electric field. In a preferred embodiment, the light transmission of the device is high when an electric field is applied and low in the initial state when no electric field is applied.

In a preferred embodiment, the device according to the invention has a boundary state A and a boundary state B. For the purposes of the present application, the term boundary state is taken to mean a state in which the transmission reaches a maximum or minimum value and changes no further or virtually no further on a further reduction or increase in the of the applied electric field.

The light modulation element preferably has the boundary state A with a transmission $T_A$ when no electrical field is applied, the so called off state, in which the liquid crystal medium is essentially homeotropically aligned.

The light modulation element preferably has another boundary state B when an electric field is applied, the so called "on state", in which the liquid crystal medium is increasingly distorted away from the vertical towards the bend state, whereby the LC medium is initially homeotropically aligned and then becomes bent.

$$T_A < T_B.$$

The light modulation element preferably exhibits an induced retardation in the "on"-state in the range from approximately 1 nm to approximately 300 nm, more preferably from approximately 1 nm to approximately 275 nm, even more preferably from approximately 1 nm to approximately 260 nm.

The low applied electric fields required to switch the light modulation elements according to the present invention have several advantages. The inter-electrode spacing is substantially larger than the inter-electrode spacing found in current IPS devices. Accordingly, lower cost patterning of the electrodes, improved yields, increased optical apertures and lower driving voltages are some benefits from the light modulation element according to the present invention.

The homeotropic "off state" of the device provides excellent optical extinction and therefore a favourable contrast.

The optics of the device are to some degree self-compensating (similar to a conventional pi-cell) and provide better viewing angle than a conventional light modulation element according to the VA mode.

The required applied electric field strength is mainly dependent on the electrode gap and the concentration of compounds of formula I as well as the Δe of the host mixture. The applied electric field strengths are typically lower than approximately 0.5 V/μm$^{-1}$, preferably lower than approximately 0.2 V/μm$^{-1}$ and more preferably lower than approximately 0.1 V/μm$^{-1}$.

Preferably, the applied driving voltage is in the range from 0 V to approximately 10 V, more preferably in the range from approximately 1 V to approximately 7V, and even more preferably in the range from approximately 1.5 V to approximately 4.V.

The nature of the switching can also be inferred from the behaviour of the device under slow square wave driving. The switched state resulting from a Fréedericksz transition has no polarity sensitivity, and the optical change as the voltage is reversed, is minimal. The bend state, however, changes the direction of its distortion in response to the applied voltage and the cell becomes optically extinct and then regains its previous appearance when the polarity changes. This provides a simple check on the nature of the distortion occurring in a particular cell/voltage combination.

In preferred embodiment, three distinct switching regimes can be observed in a light modulation element according to the present invention:
1. At low applied electric fields, the induced retardation increases as a result from the induced flexoelectric bend distortion,
2. At fields approaching the Fréedericksz critical field, the transmission increases rapidly. Even at fields appreciably above the Fréedericksz threshold, the induced flexoelectric bend distortion remains a polarity dependent bend mode, 3. At still higher fields, a Fréedericksz distortion grows into the cell from the electrodes. This results in a large increase in retardation, and the cell no longer responds to polarity changes.

Accordingly, at low applied electric fields, the induced retardation increases as a result from the distinct flexoelectric switching regime and at higher applied electric fields approaching the Fréedericksz critical field, the transmission increases rapidly as a result from the distinct dielectric switching regime.

The light modulation element according to the present invention can be operated with a conventional driving waveform as commonly known by the expert.

However, in a preferred embodiment according to the present invention an alternative driving waveform can be utilized. Therefore, a short duration 'kick' or pre-pulse that is a number of times larger than the amplitude of the DC pulse required to obtain the desired amplitude of switching can be used to simulate the presence of a higher voltage, thus allowing a faster switching speed to be obtained.

A typical process for the production of a light modulation element according to the invention comprises the following steps:
cutting and cleaning glass substrates, on which the electrodes are arranged,
coating the substrates with an alignment layer agent,
assembling the cell using a UV curable adhesive, and
filling the cell with the liquid-crystalline medium.

The light modulation element of the present invention can be used in various types of optical and electro-optical devices.

Said optical and electro optical devices include, without limitation electrooptical displays, liquid crystal displays (LCDs), non-linear optic (NLO) devices, and optical information storage devices.

Especially preferred features of the invention are summarized in form of a numbered list:

1. Light modulation element comprising a flexoelectric polarisable liquid-crystalline medium, characterized in that the switching from a boundary state A to a boundary state B involves a combination of a flexoelectric switching regime and a dielectric switching regime upon application of an electric field.
2. The light modulation element according to note 1, characterized in that the liquid-crystalline medium which is sandwiched between at least two substrates, is homeotropically aligned to both substrate surfaces in the boundary state A.
3. The light modulation element according to note 1 or 2, wherein the liquid-crystalline medium comprises a bent core liquid-crystalline compound having an absolute value of the bend flexoelectric coefficient |e₃| in the range from 1 pCm⁻¹ to 60 pCm⁻¹
4. The light modulation element according to one or more of notes 1 to 3, wherein the liquid crystal medium comprises at least one bent core compound selected from the compounds of formula I

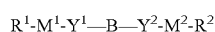    I wherein the parameters $R^1$, $M^1$, $Y^1$, $Y^2$, $M^2$ and $R^2$ have the same meanings as given above for formula I.

5. The light modulation element according to one or more of notes 1 to 4, wherein the amount of compounds of formula in the liquid-crystalline medium as a whole is in the range from 3 to 70%.
6. The light modulation element according to one or more of notes 1 to 5, wherein the liquid-crystalline medium comprises one or more compounds of formulae II and III,

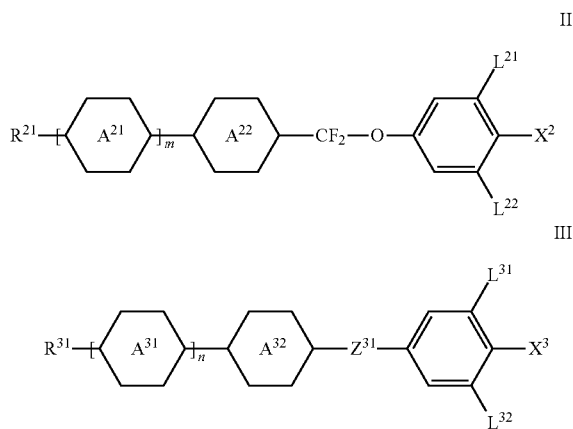

wherein the parameters have the same meaning as given above for formulae II and III.

7. The light modulation element according to one or more of notes 1 to 6, wherein the liquid-crystalline medium comprises one or more compounds of formula IV

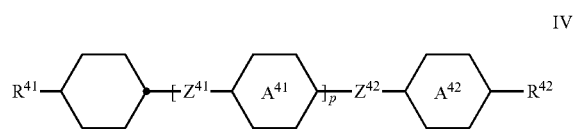

wherein the parameters have the same meaning as given above for formula IV.

8. The light modulation element according to one or more of notes 1 to 7, wherein the liquid-crystalline medium comprise one or more compounds of the formula V,

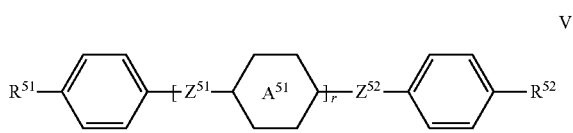

wherein the parameters have the same meaning as given above for formula V.

9. The light modulation element according to one or more of notes 1 to 8, wherein the amount of compounds of the formulae II and/or III in the liquid-crystalline medium as a whole is in the range from 2 to 90%.
10. The light modulation element according to one or more of notes 1 to 9, wherein the amount of compounds of the formulae IV and/or V in the liquid-crystalline medium as a whole is in the range from 2 to 70%.
11. The light modulation element according to one or more of notes 1 to 10, wherein the liquid-crystalline medium exhibits a dielectric positive anisotropy of ≤3.

12. The light modulation element according to one or more of notes 1 to 11, wherein the liquid-crystalline medium exhibits a birefringence in the range from 0.10 or more to 0.35 or more.
13. The light modulation element according to one or more of notes 1 to 12, wherein the light modulation is induced by an applied in-plane electric field
14. The light modulation element according to one or more of notes 1 to 13, wherein the flexoelectric switching occurs at applied electric field strength lower than 0.5 V/μm-1.
15. The light modulation element according to one or more of notes 1 to 14, wherein the induced retardation in the "on-state" is in the range from 1 nm to 300 nm.
16. Method for production of a light modulation element according to one or more of notes 1 to 15, comprising at least the step of filling the liquid-crystalline medium into a cell.
17. Use of a light modulation element according to one or more of notes 1 to 15 in an electro-optical device.
18. Electro-optical device comprising the light modulation element according to one or more of claims 1 to 15.

It will be appreciated that variations to the foregoing embodiments of the invention can be made while still falling within the scope of the invention. Each feature disclosed in this specification, unless stated otherwise, may be replaced by alternative features serving the same, equivalent, or similar purpose. Thus, unless stated otherwise, each feature disclosed is one example only of a generic series of equivalent or similar features.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

It will be appreciated that many of the features described above, particularly of the preferred embodiments, are inventive in their own right and not just as part of an embodiment of the present invention. Independent protection may be sought for these features in addition to or alternative to any invention presently claimed.

In the present application and in the examples below, the structures of the liquid-crystal compounds are indicated by means of acronyms, with the transformation into chemical formulae taking place in accordance with Tables A and B below. All radicals $C_nH_{2n+1}$ and $C_mH_{2m+1}$ are straight-chain alkyl radicals having n and m C atoms respectively; n, m and k are integers and preferably denote 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$, $L^{3*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nCl | $C_nH_{2n+1}$ | Cl | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |

Preferred mixture components are found in Tables A and B.

TABLE A

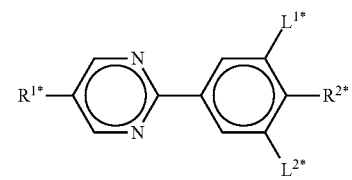

PYP

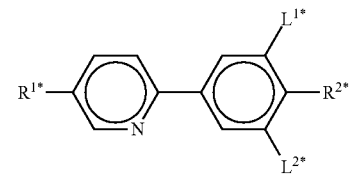

PYRP

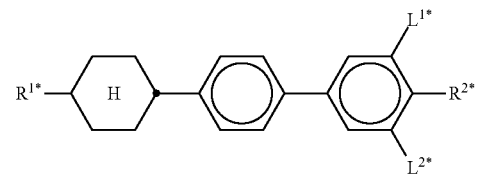

BCH

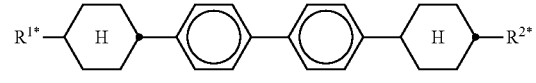

CBC

TABLE A-continued
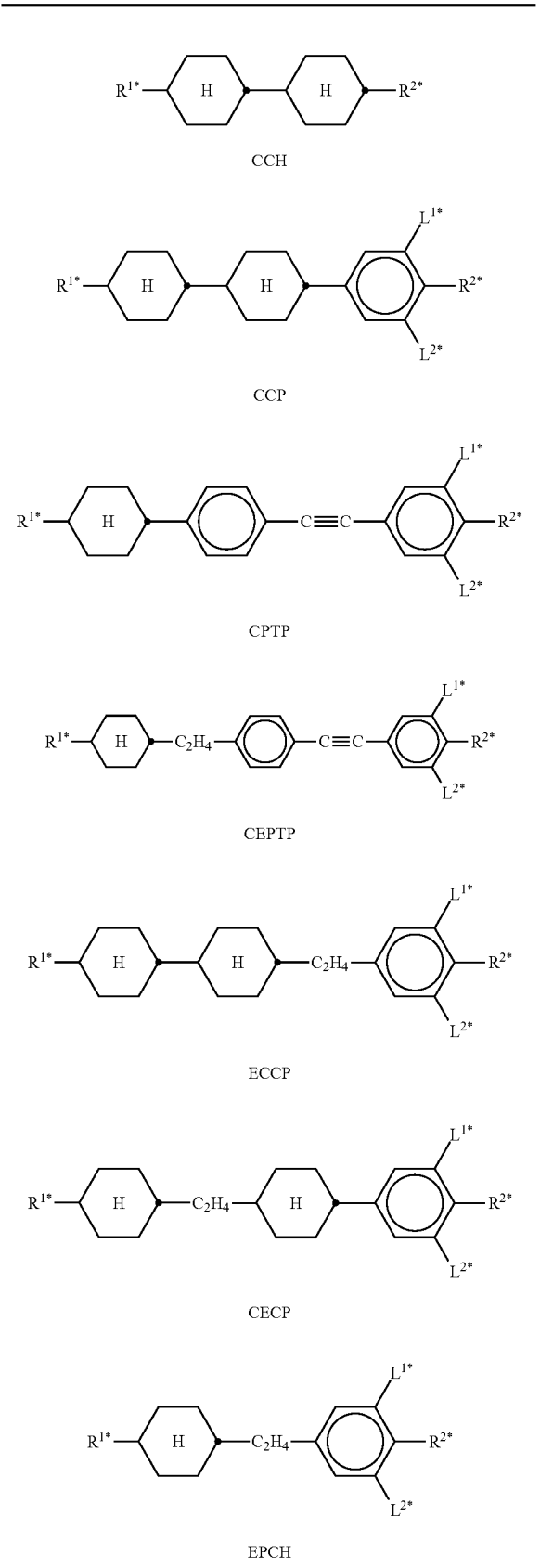
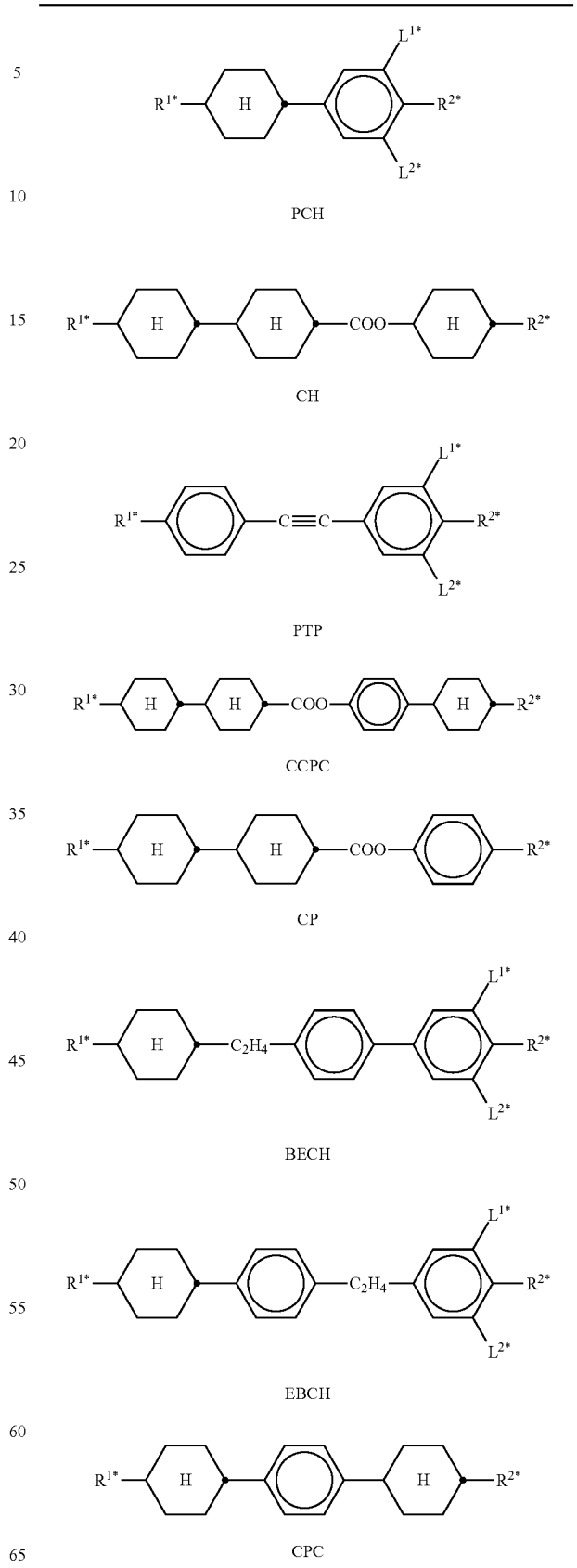

TABLE A-continued
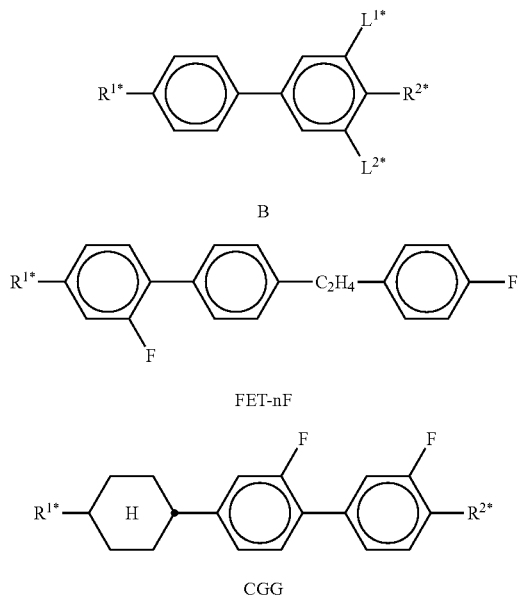
B
FET-nF
CGG
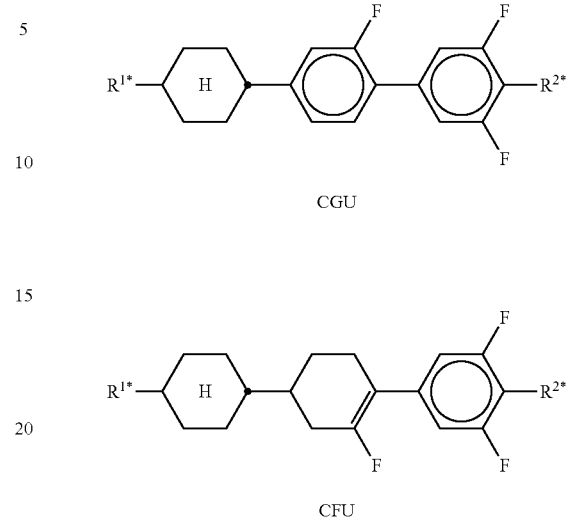
CGU
CFU
TABLE B
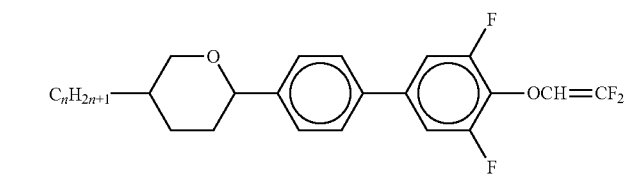
APU-n-OXF
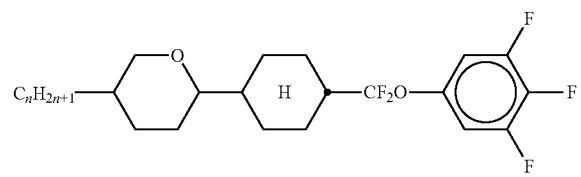
ACQU-n-F
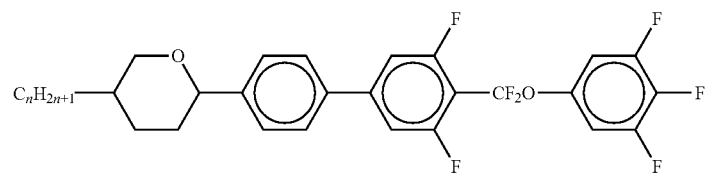
APUQU-n-F
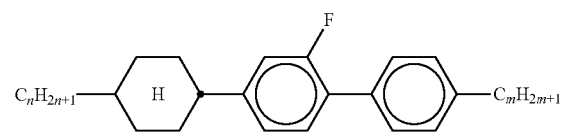
BCH-n.Fm TABLE B-continued
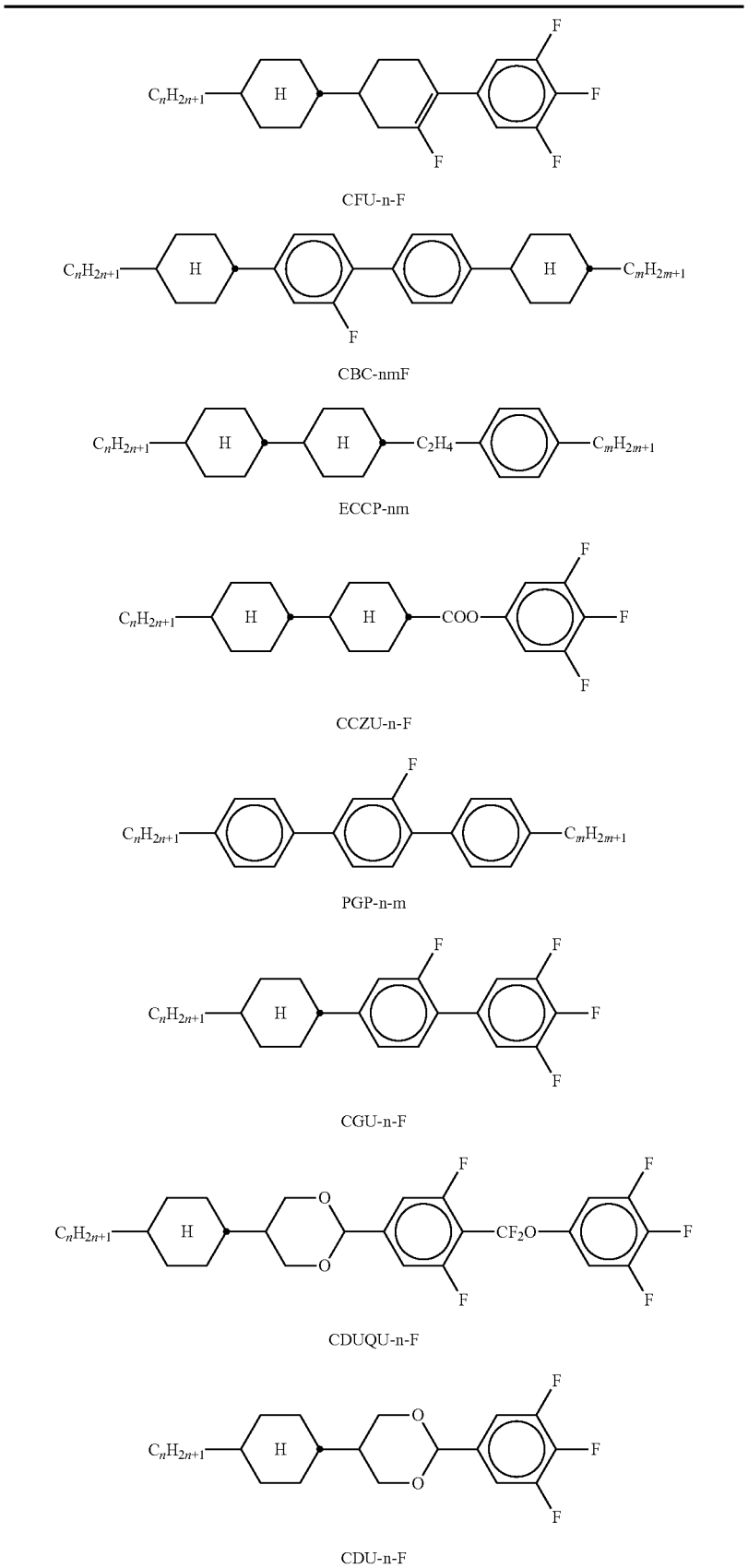

TABLE B-continued
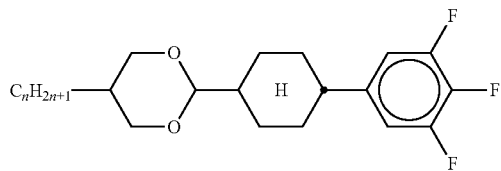
DCU-n-F
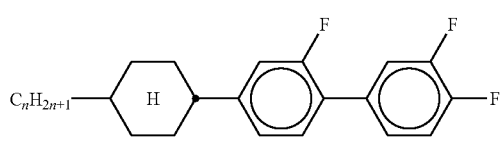
CGG-n-F
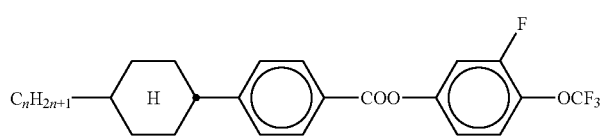
CPZG-n-OT
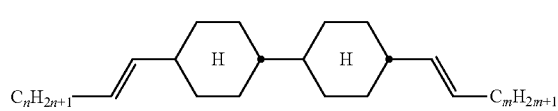
CC-nV-Vm
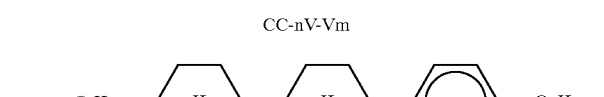
CCP-Vn-m
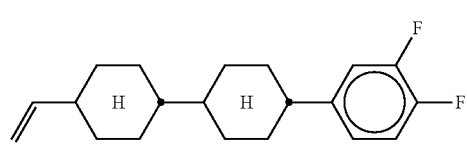
CCG-V-F
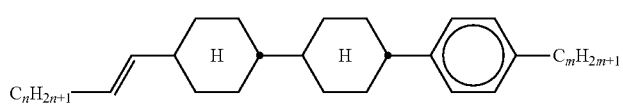
CCP-nV-m
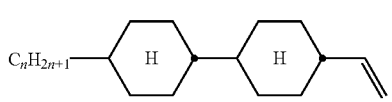
CC-n-V
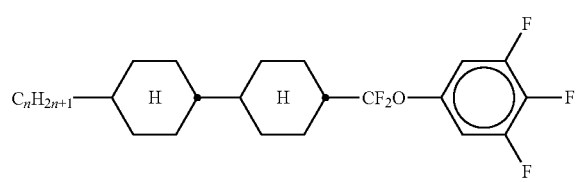
CCQU-n-F TABLE B-continued
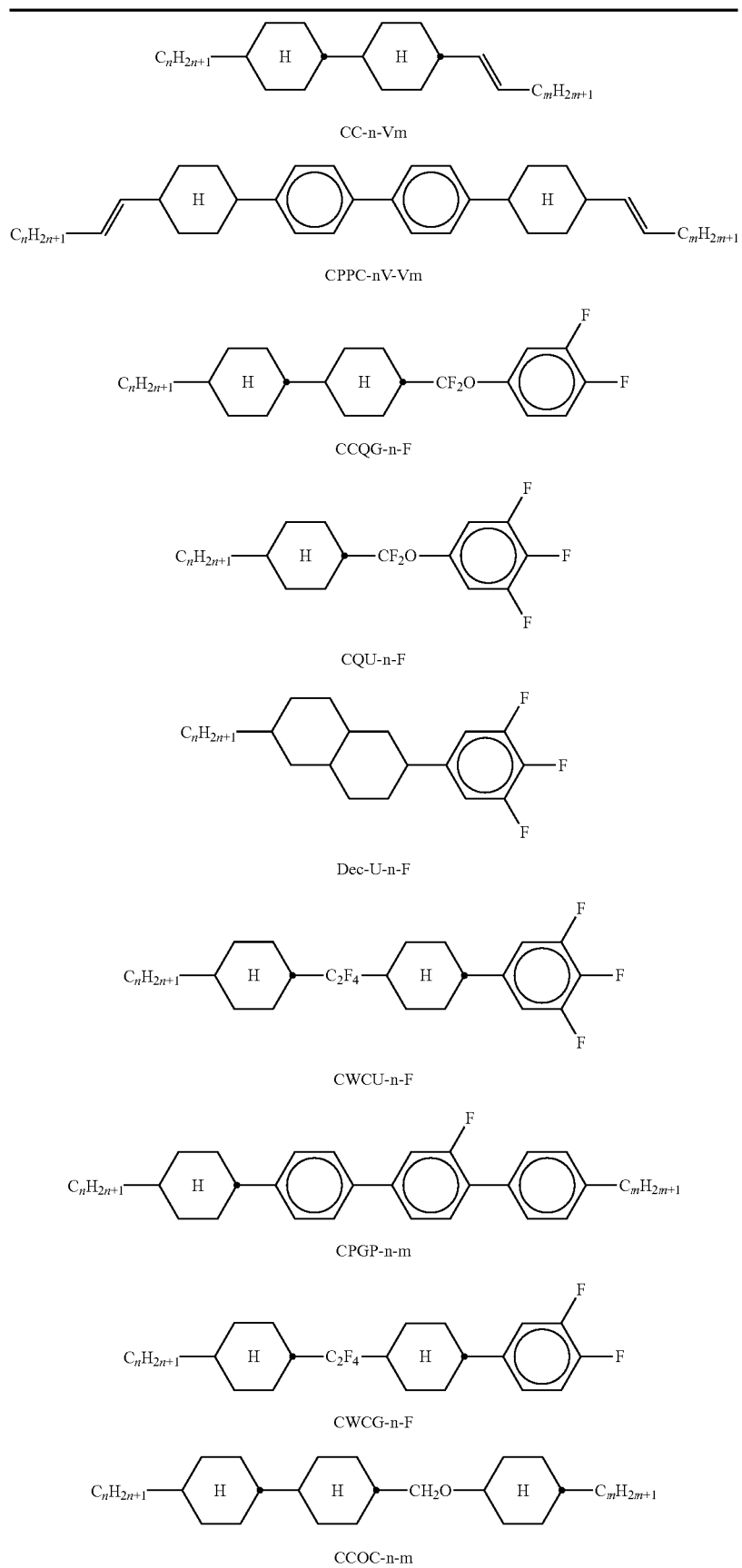

TABLE B-continued
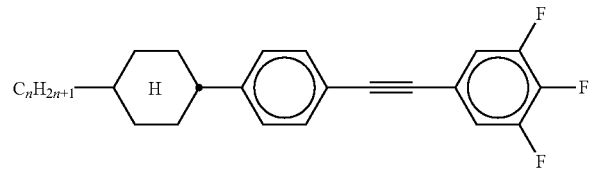
CPTU-n-F
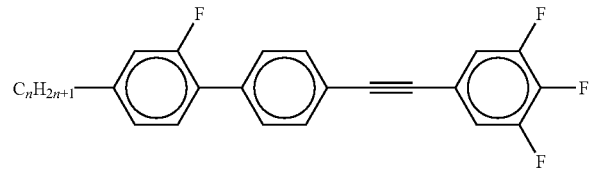
GPTU-n-F
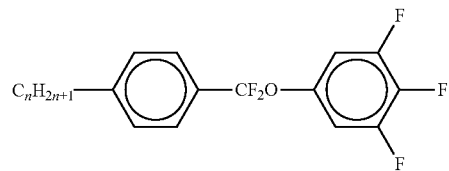
PQU-n-F
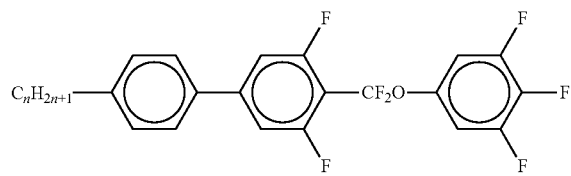
PUQU-n-F
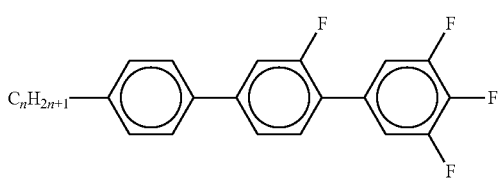
PGU-n-F
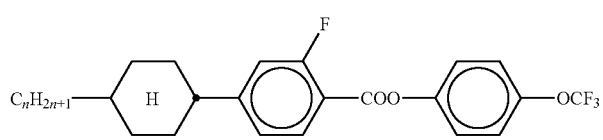
CGZP-n-OT
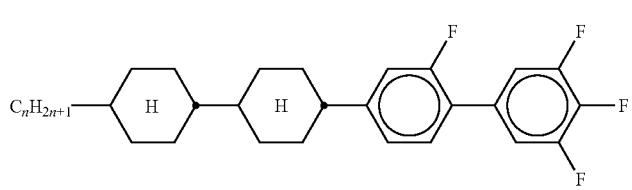
CCGU-n-F TABLE B-continued
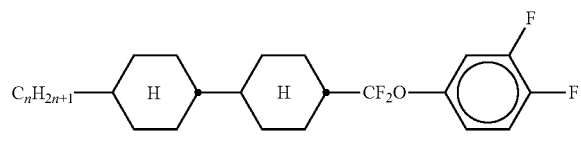
CCQG-n-F
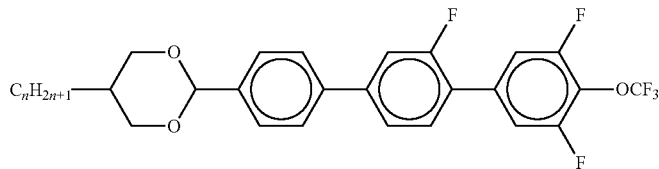
DPGU-n-OT
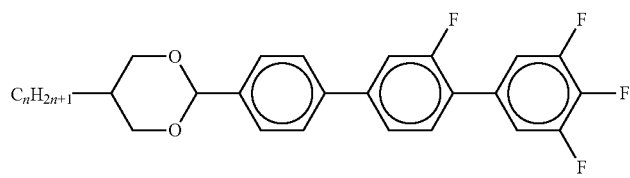
DPGU-n-F
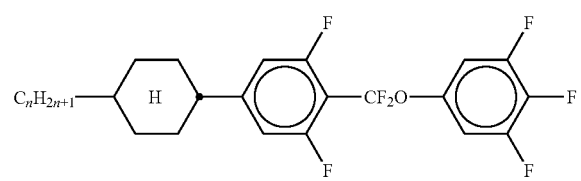
CUQU-n-F
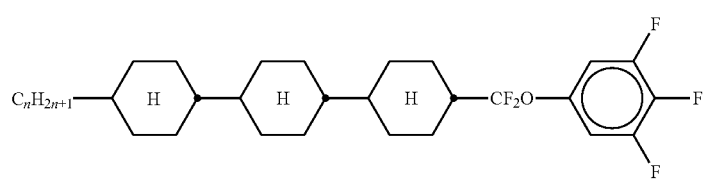
CCCQU-n-F
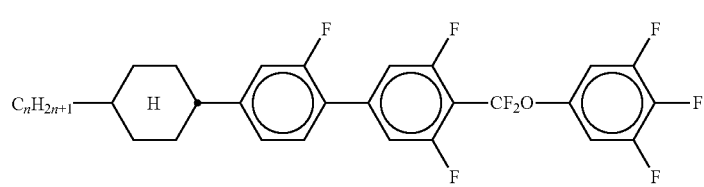
CGUQU-n-F
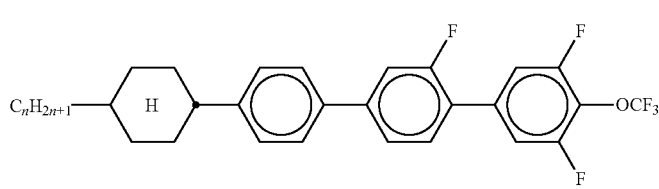
CPGU-n-OT TABLE B-continued
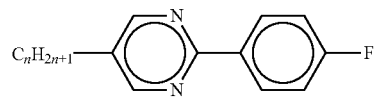
PYP-n-F
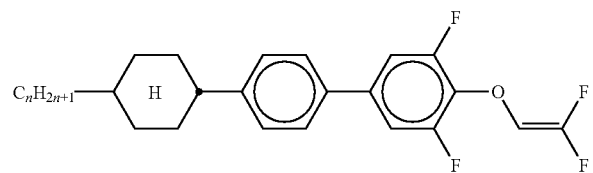
CPU-n-OXF
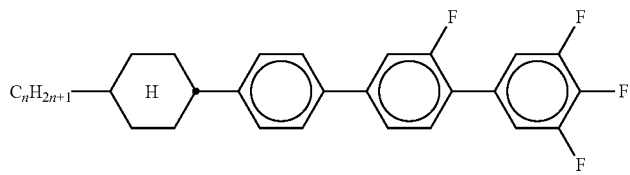
CPGU-n-F
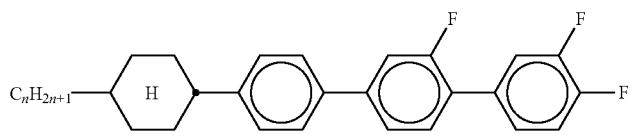
CPGG-n-F
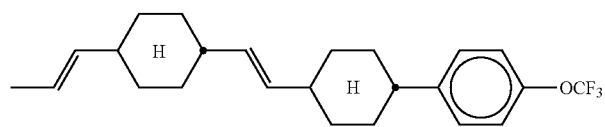
CVCP-1V-OT
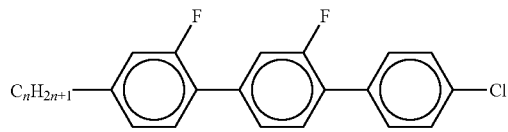
GGP-n-Cl
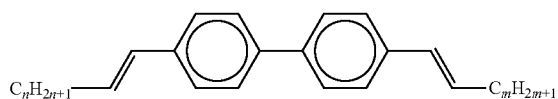
PP-nV-Vm
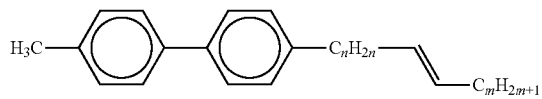
PP-1-nVm TABLE B-continued
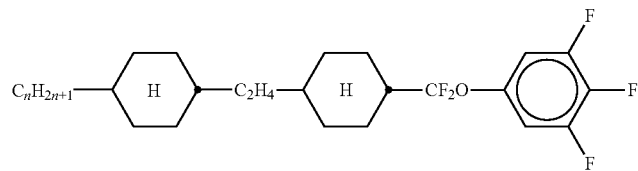
CWCQU-n-F
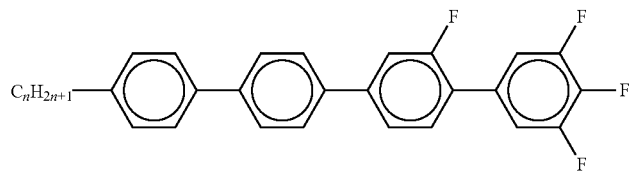
PPGU-n-F
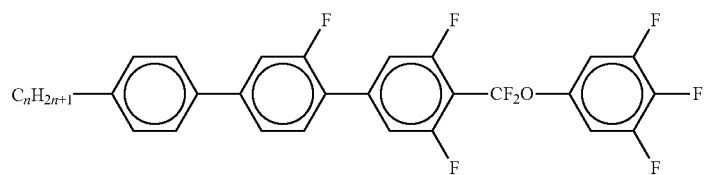
PGUQU-n-F
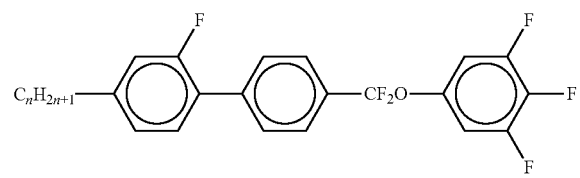
GPQU-n-F
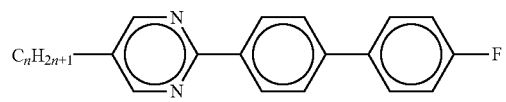
MPP-n-F
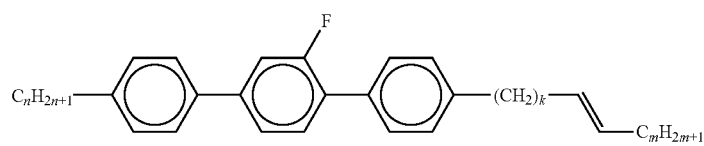
PGP-n-kVm
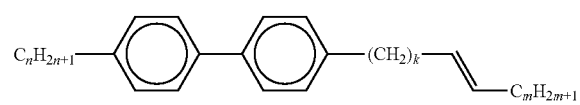
PP-n-kVm
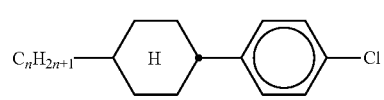
PCH-nCl TABLE B-continued
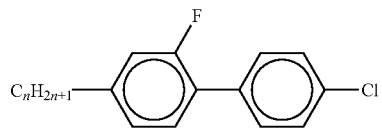
GP-n-Cl
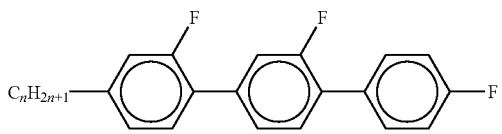
GGP-n-F
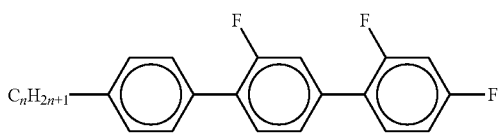
PGIGI-n-F
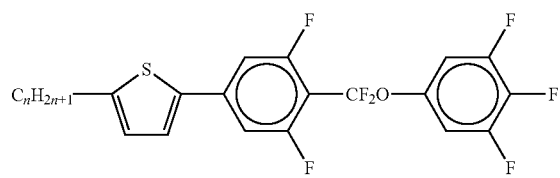
SUQU-n-F
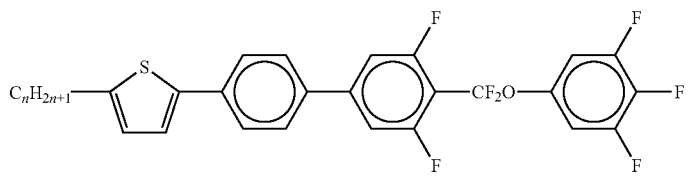
SPUQU-n-F
In a preferred embodiment of the present invention, the LC media according to the invention comprise one or more compounds selected from the group consisting of compounds from Tables A and B.
TABLE C
Table C indicates possible stabilizers, which can be added to the LC media according to the invention.
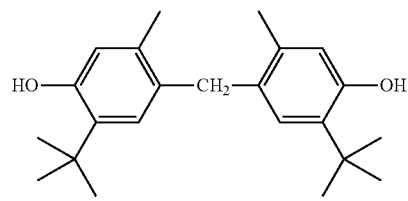 [SMILES: Cc1cc(O)c(C(C)(C)C)cc1Cc1cc(C(C)(C)C)c(O)cc1C]
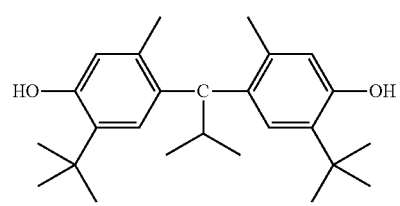 [SMILES: Cc1cc(O)c(C(C)(C)C)cc1C(c1cc(C(C)(C)C)c(O)cc1C)C(C)C]

TABLE C-continued
Table C indicates possible stabilizers, which can be added to the LC media according to the invention.
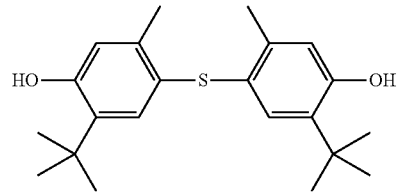 [SMILES: Cc1cc(O)c(C(C)(C)C)cc1Sc1cc(C(C)(C)C)c(O)cc1C]
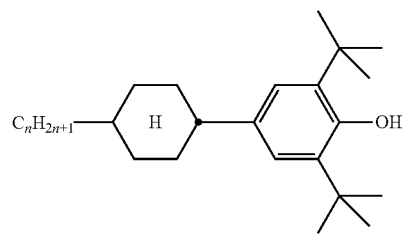
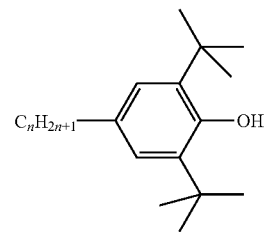
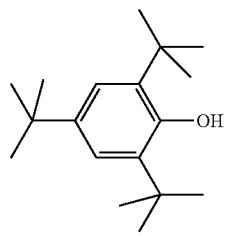 [SMILES: CC(C)(C)c1cc(C(C)(C)C)c(O)c(C(C)(C)C)c1]
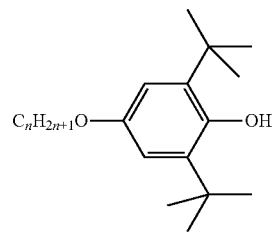
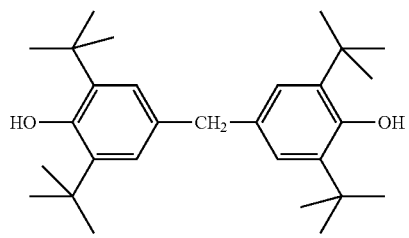 [SMILES: CC(C)(C)c1cc(Cc2cc(C(C)(C)C)c(O)c(C(C)(C)C)c2)cc(C(C)(C)C)c1O]

TABLE C-continued
Table C indicates possible stabilizers, which can be added to the LC media according to the invention.
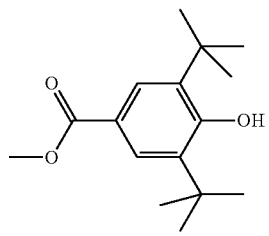 [SMILES: COC(=O)c1cc(C(C)(C)C)c(O)c(C(C)(C)C)c1]
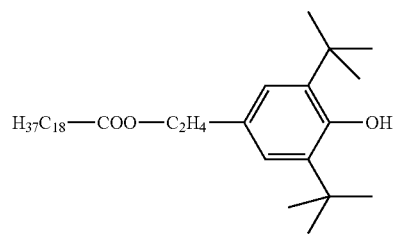
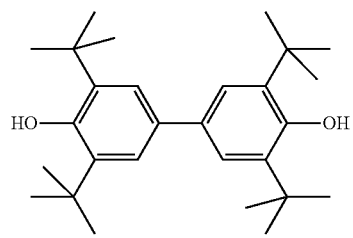 [SMILES: CC(C)(C)c1cc(-c2cc(C(C)(C)C)c(O)c(C(C)(C)C)c2)cc(C(C)(C)C)c1O]
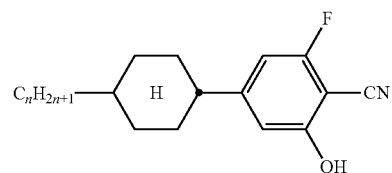
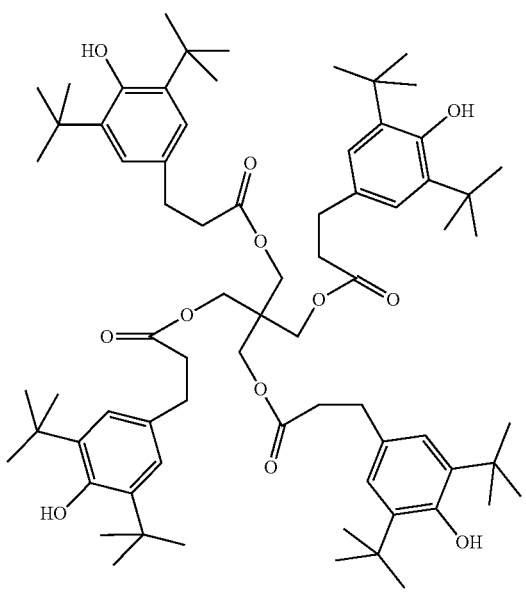 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE C-continued
Table C indicates possible stabilizers, which can be added to the LC media according to the invention.
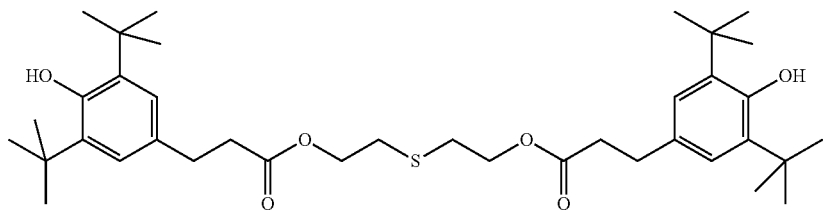 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
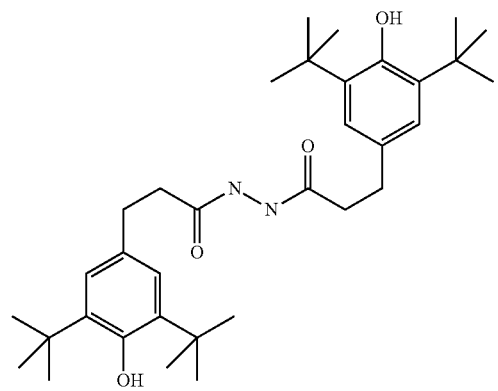 [SMILES: CC(C)(C)c1cc(CCC(=O)NNC(=O)CCc2cc(C(C)(C)C)c(O)c(C(C)(C)C)c2)cc(C(C)(C)C)c1O]
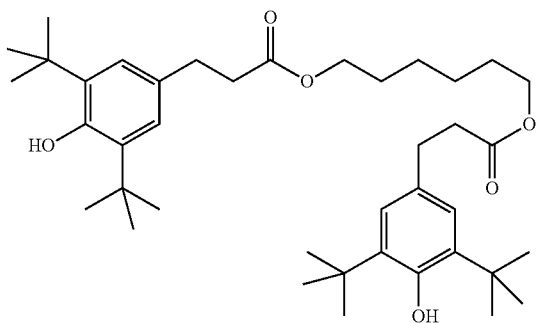 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
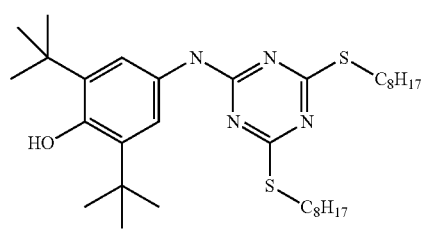

TABLE C-continued
Table C indicates possible stabilizers, which can be added to the LC media according to the invention.
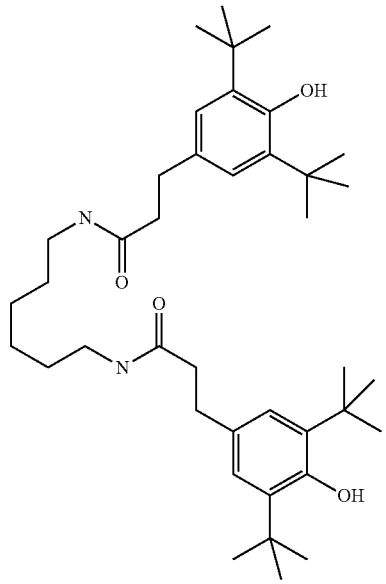 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
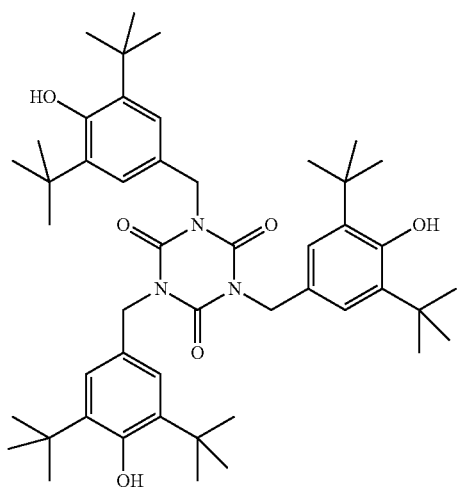 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
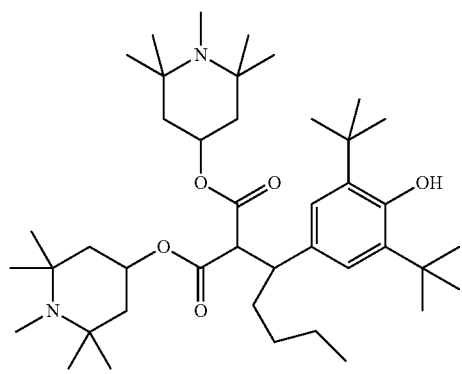 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE C-continued
Table C indicates possible stabilizers, which can be added to the
LC media according to the invention.
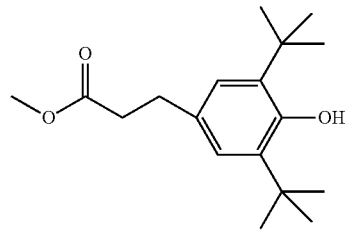 [SMILES: COC(=O)CCc1cc(C(C)(C)C)c(O)c(C(C)(C)C)c1]
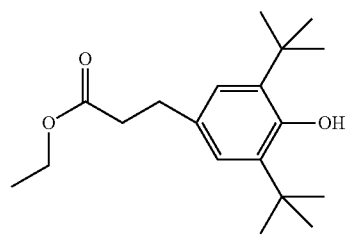 [SMILES: CCOC(=O)CCc1cc(C(C)(C)C)c(O)c(C(C)(C)C)c1]
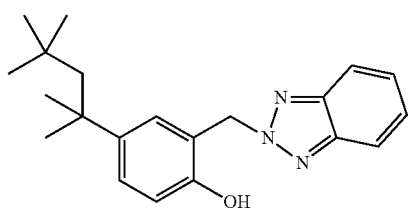 [SMILES: CC(C)(C)CC(C)(C)c1ccc(O)c(Cn2nc3ccccc3n2)c1]
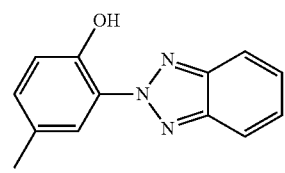 [SMILES: Cc1ccc(O)c(-n2nc3ccccc3n2)c1]
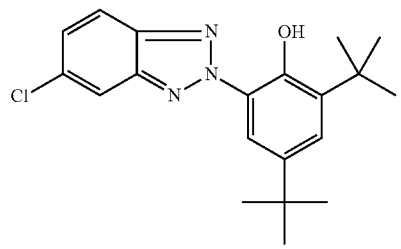 [SMILES: CC(C)(C)c1cc(-n2nc3ccc(Cl)cc3n2)c(O)c(C(C)(C)C)c1]
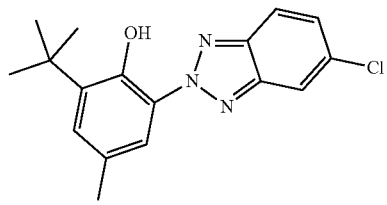 [SMILES: Cc1cc(-n2nc3ccc(Cl)cc3n2)c(O)c(C(C)(C)C)c1]

TABLE C-continued
Table C indicates possible stabilizers, which can be added to the LC media according to the invention.
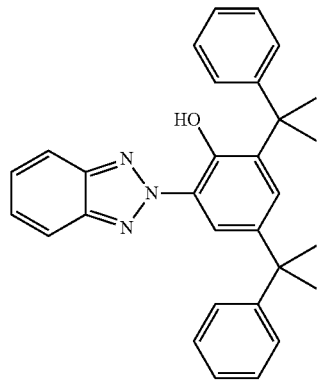 [SMILES: CC(C)(c1ccccc1)c1cc(-n2nc3ccccc3n2)c(O)c(C(C)(C)c2ccccc2)c1]
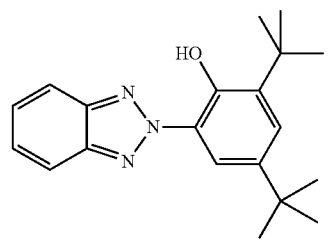 [SMILES: CC(C)(C)c1cc(-n2nc3ccccc3n2)c(O)c(C(C)(C)C)c1]
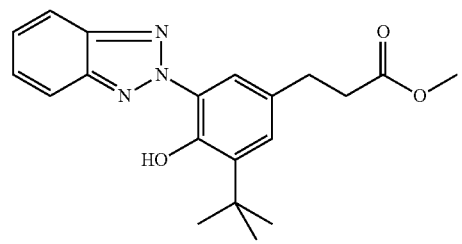 [SMILES: COC(=O)CCc1cc(-n2nc3ccccc3n2)c(O)c(C(C)(C)C)c1]
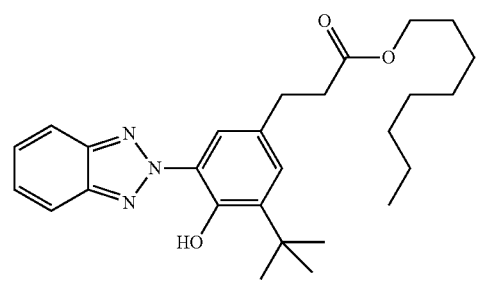 [SMILES: CCCCCCCCOC(=O)CCc1cc(-n2nc3ccccc3n2)c(O)c(C(C)(C)C)c1]

TABLE C-continued

Table C indicates possible stabilizers, which can be added to the
LC media according to the invention.

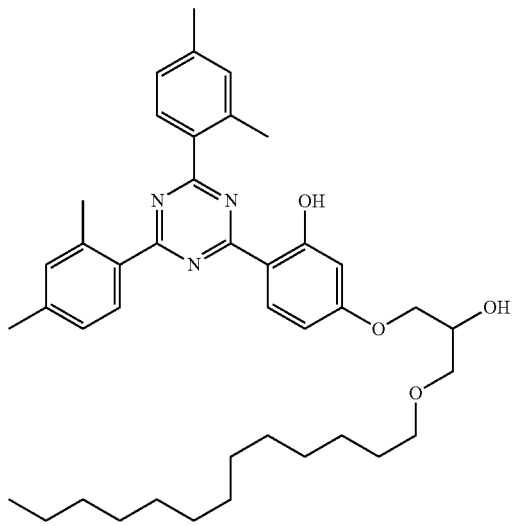 [SMILES: CCCCCCCCCCCCCOCC(O)COc1ccc(-c2nc(-c3ccc(C)cc3C)nc(-c3ccc(C)cc3C)n2)c(O)c1]

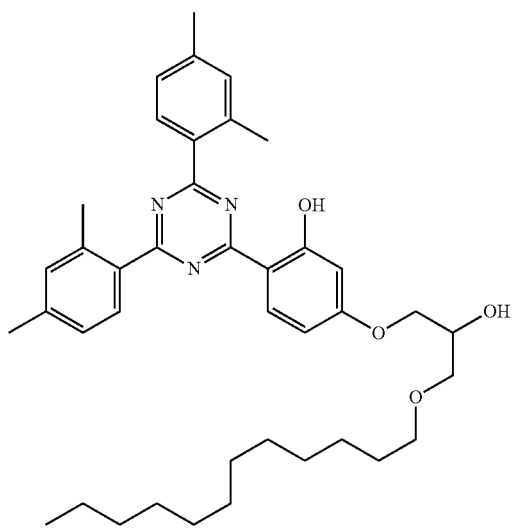 [SMILES: CCCCCCCCCCCCOCC(O)COc1ccc(-c2nc(-c3ccc(C)cc3C)nc(-c3ccc(C)cc3C)n2)c(O)c1]

The LC media preferably comprise 0 to 10% by weight, in particular 0.01 to 5% by weight and particularly preferably 0.1 to 3% by weight, of dopants. The LC media preferably comprise one or more dopants selected from the group consisting of compounds from Table C.

EXAMPLES

A cell is prepared by the following method: Two glass substrates are cleaned in deionised water in an ultrasound bath for 10 minutes, dried in a stream of air and immersed for 60 seconds in a solution of 20% KOH in deionised water. The substrates are rinsed in deionised water, dried under a stream of air, and dipped into a solution of a Quilon C, Chrome Complex solution for 60 seconds. The treated substrates are rinsed briefly in deionised water and dried at 150° C. for 60 minutes. Subsequently, two strips of aluminium foil of 30 μm thickness were cut and placed parallel to each other on one of the substrates with a narrow gap of approximately 1 mm between the electrodes.

A thin bead of Norland Optical Adhesive #65 is applied around the outside of the electrodes and the formed cell is subjected to pressure and Norland Optical Adhesive #65 was exposed to UV light (350 nm) to glue the cell together and to seal the edges leaving two gaps to allow filling with liquid crystal mixture.

Example 1

A mixture containing 30% of compound (1) in ZLI-1132 (70%) is prepared and introduced into the cell by capillary filling at 80° C.

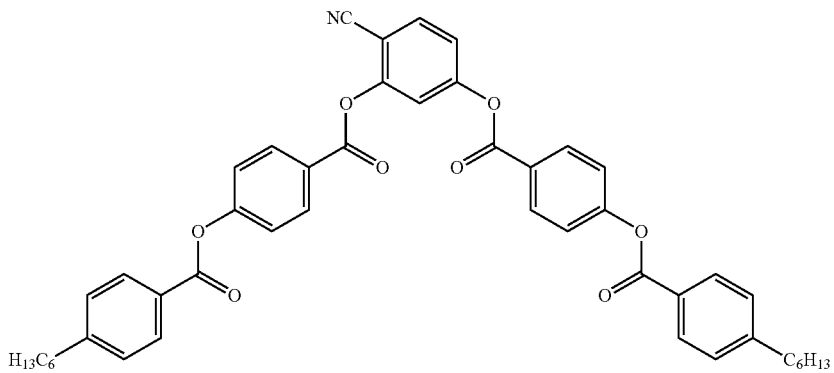

The cell is held at 60° C. for 30 minutes and cooled down to ambient temperature. Wires are attached to the aluminium foil electrodes using conductive adhesive (RS 186-3600, silver-loaded electrically conductive paint) and clips. A dc voltage is applied and the transmission of the cell is recorded using a standard photodiode on a polarising microscope. The transmission as a function of voltage is shown in table 1.

TABLE 1

Transmission of the cell as a function of the applied electric field.

| Applied Field [V$\mu$m$^{-1}$] | Transmission [%] |
|---|---|
| 0.0000 | 0.2 |
| 0.0133 | 0.0 |
| 0.0263 | 0.3 |
| 0.0396 | 3.5 |
| 0.0459 | 7.8 |
| 0.0525 | 17.8 |
| 0.0584 | 36.5 |
| 0.0645 | 66.7 |

As can be seen from the table, at low applied electric fields, the induced retardation increases as a result from the induced flexoelectric bend distortion.

At fields approaching the Fréedericksz critical field of 0.75 V$\mu$m$^{-1}$, the transmission increases rapidly. Even at fields appreciably above the Fréedericksz threshold, the induced flexoelectric bend distortion remains a polarity dependent bend mode, At still higher fields above 0.75 V$\mu$m$^{-1}$, a Fréedericksz distortion grows into the cell from the electrodes. This results in a large increase in retardation, and the cell no longer responds to polarity changes.

Example 2

A mixture containing 63.6% ZLI-1132, 27.3% of compound (1) and 9.1% of compound (2) is prepared.

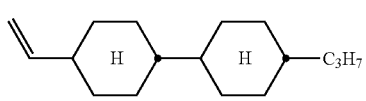

The cell is held at 60° C. for 30 minutes and cooled down to ambient temperature. Wires are attached to the aluminium foil electrodes using conductive adhesive (RS 186-3600, silver-loaded electrically conductive paint) and clips. A dc voltage is applied and the transmission of the cell is recorded using a standard photodiode on a polarising microscope (table 2).

TABLE 2

Transmission of the cell as a function of the applied electric field.

| Applied Field/V$\mu$m$^{-1}$ | Transmission % |
|---|---|
| 0.000 | 0.00 |
| 0.034 | 0.15 |
| 0.056 | 0.58 |
| 0.068 | 0.90 |
| 0.079 | 1.60 |
| 0.090 | 2.44 |
| 0.102 | 4.00 |
| 0.113 | 6.38 |

The invention claimed is:

1. Light modulation element comprising at least two substrates and a flexoelectric polarisable liquid-crystalline medium sandwiched between at least two substrates, wherein the liquid-crystalline medium is homeotropically aligned to both substrate surfaces it is sandwiched between in a boundary state A when no electric field is applied, and wherein the element effects switching from the boundary state A to a boundary state B through a combination of a flexoelectric switching regime and a dielectric switching regime upon application of an electric field, and wherein the liquid crystal medium comprises at least one bent core compound selected from the compounds of formula I,

wherein $Y^1$ and $Y^2$ are in each case independently —O—, —S—, —CO—, —COO—, —OCO—, —OCO—O—, —CO—NR0-, —NR$_0$—CO—, —OCH$_2$—, —CH$_2$O—, —SCH$_2$—, —CH$_2$S—, —CH=CH—COO—, —OOC—CH=CH— or a single bond, $R^0$ is H or alkyl with 1 to 4 C atoms, $M^1$ and $M^2$ are independently of each other a mesogenic group, B is selected from the following groups:

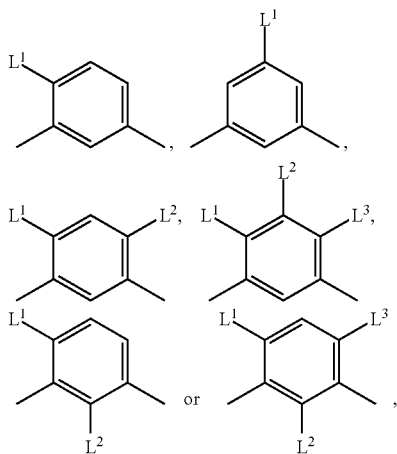

where $L^1$, $L^2$ and $L^3$ are selected from F, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, and $OC_2F_5$, and $R^1$ and $R^2$ denote, each and independently from another, H, F, Cl, CN, OCN, SCN, $SF_5$, $NO_2$ or a straight-chain or branched alkyl radical with up to 25 C atoms which may be unsubstituted, mono- or polysubstituted by halogen or CN, it being also possible for one or more non-adjacent $CH_2$ groups to be replaced, in each case independently from one another, by —O—, —S—, —NH—, —N($CH_3$)—, —CO—, —COO—, —OCO—, —OCO—O—, —S—CO—, —CO—S—, —CH=CH— or —C≡C— in such a manner that oxygen atoms are not linked directly to one another.

2. The light modulation element according to claim 1, wherein the liquid-crystalline medium comprises a bent core liquid-crystalline compound having an absolute value of the bend flexoelectric coefficient $|e_3|$ in the range from 1 $pCm^{-1}$ to 60 $pCm^{-1}$.

3. The light modulation element according to claim 1, wherein the amount of compounds of formula I in the liquid-crystalline medium as a whole is in the range from 3 to 70%.

4. The light modulation element according to claim 1, wherein the liquid-crystalline medium comprises one or more compounds of formulae II and III,

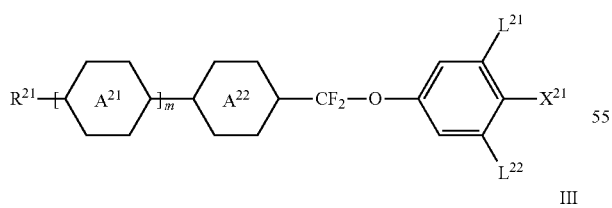
II

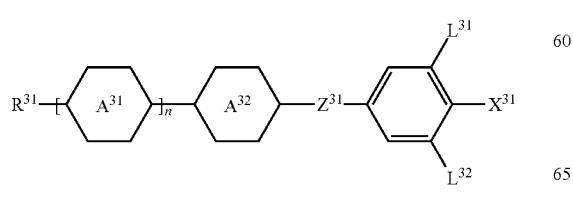
III in which $R^{21}$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

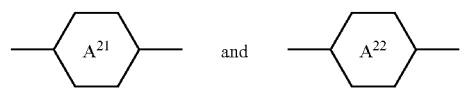

on each appearance, independently of one another, denote

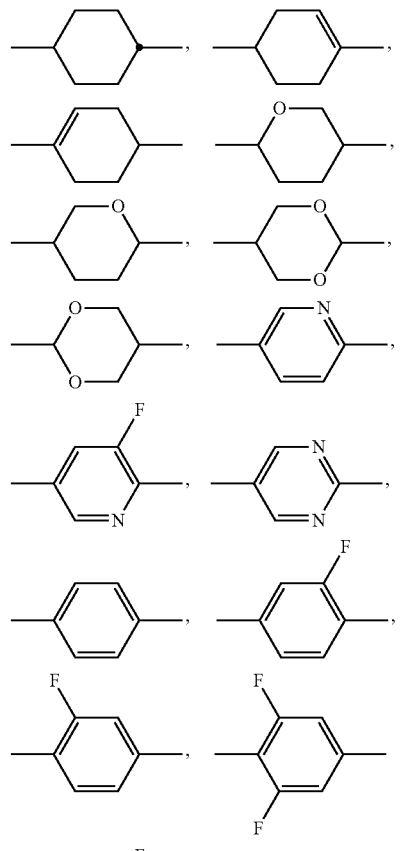

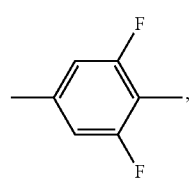

$L^{21}$ and $L^{22}$ denote H or F, $X^{21}$ denotes halogen, halogenated alkyl or alkoxy having 1 to 3 C atoms or halogenated alkenyl or alkenyloxy having 2 or 3 C atoms, m denotes 0, 1, 2 or 3, $R^{31}$ denotes alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms,

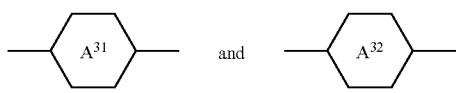 and on each appearance, independently of one another, are

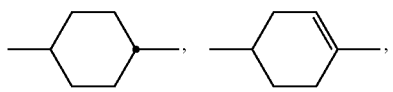
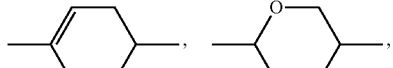
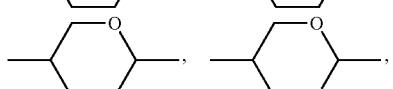
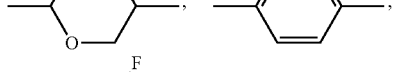
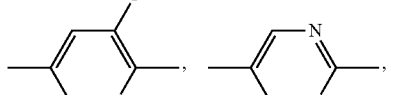
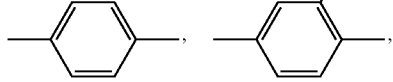
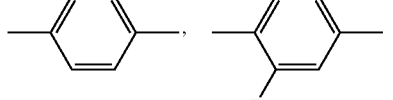
 or

$L^{31}$ and $L^{32}$ independently of one another, denote H or F, $X^{31}$ denotes halogen, halogenated alkyl or alkoxy having 1 to 3 C atoms or halogenated alkenyl or alkenyloxy having 2 or 3 C atoms, $Z^{31}$ denotes —CH$_2$CH$_2$—, —CF$_2$CF$_2$—, —COO—, trans-CH=CH—, trans-CF=CF—, —CH$_2$O— or a single bond, and n denotes 0, 1, 2 or 3.

5. The light modulation element according to claim 1, wherein the liquid-crystalline medium comprises one or more compounds of formula IV

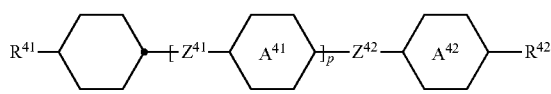  IV in which

R$^{41}$ and R$^{42}$ independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, L$^{21}$ and L$^{22}$ denote H or F,

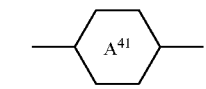 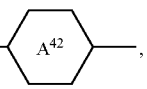, independently of one another and, if

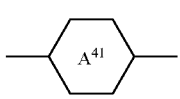

occurs twice, also these independently of one another, denote

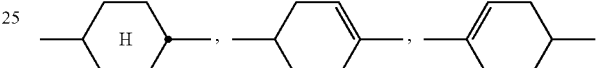
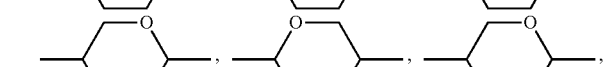
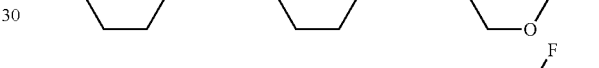
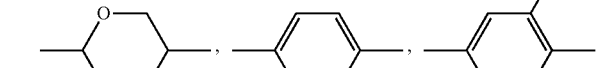
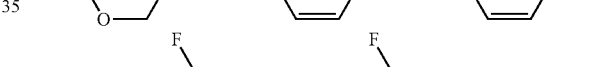
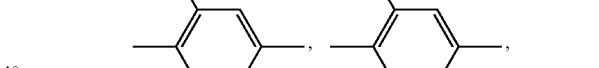

$Z^{41}$ and $Z^{42}$ independently of one another and, if $Z^{41}$ occurs twice, also these independently of one another, denote —CH$_2$CH$_2$—, —COO—, trans-CH=CH—, trans-CF=CF—, —CH$_2$O—, —CF$_2$O—, —C≡C— or a single bond, and p denotes 0, 1 or 2.

6. The light modulation element according to claim 1, wherein the liquid-crystalline medium comprises one or more compounds of the formula V,

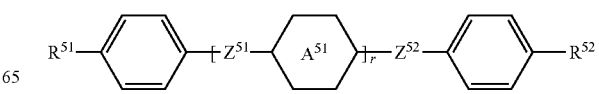  V in which
R$^{51}$ and R$^{52}$ independently of one another, denote alkyl, alkoxy, fluorinated alkyl or fluorinated alkoxy having 1 to 7 C atoms, alkenyl, alkenyloxy, alkoxyalkyl or fluorinated alkenyl having 2 to 7 C atoms, L$^{21}$ and L$^{22}$ denote H or F,

on each appearance, independently of one another, denotes

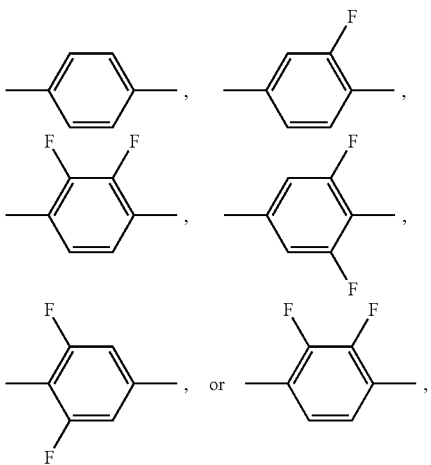

Z$^{51}$ and Z$^{52}$ independently of one another and, if Z$^{51}$ occurs twice, also these independently of one another, denote —CH$_2$CH$_2$—, —COO—, trans-CH=CH—, trans-CF=CF—, —CH$_2$O—, —CF$_2$O— or a single bond, and r denotes 0, 1 or 2.

7. The light modulation element according to claim 4, wherein the amount of compounds of the formulae II and/or III in the liquid-crystalline medium as a whole is in the range from 2 to 90%.

8. The light modulation element according to claim 5, wherein the amount of compounds of the formulae IV in the liquid-crystalline medium as a whole is in the range from 2 to 70%.

9. The light modulation element according to claim 1, wherein the liquid-crystalline medium exhibits a dielectric positive anisotropy of ≥3.

10. The light modulation element according to claim 1, wherein the liquid-crystalline medium exhibits a birefringence in the range from 0.10 or more to 0.35 or more.

11. The light modulation element according to claim 1, wherein the element exhibits light modulation induced by an applied in-plane electric field.

12. The light modulation element according to claim 1, wherein the element exhibits flexoelectric switching at an applied electric field strength lower than 0.5 V/μm−1.

13. The light modulation element according to claim 1, wherein the boundary state B has a transmission T$_B$ when an electrical field is applied, which is termed in the "on" state, and the element exhibits an induced retardation in the "on"-state in the range from 1 nm to 300 nm.

14. Method for production of a light modulation element according to claim 1, comprising at least a step of filling a cell formed by the at least two substrates with the liquid-crystalline medium.

15. Electro-optical device comprising the light modulation element according to claim 1.

16. The light modulation element according to claim 5, wherein the amount of compounds of the formula IV in the liquid-crystalline medium as a whole is in the range from 2 to 70%.

17. A method comprising operating an electro-optical device wherein the operation of the device comprises light modulation as a result of application of an electric field and wherein the device comprises a light modulation element according to claim 1.

18. The light modulation element according to claim 1, wherein the boundary state A has a transmission T$_A$ when no electrical field is applied, which is termed the "off" state, and the boundary state B has a transmission T$_B$ when an electrical field is applied, which is termed the "on" state, and whereby: T$_A$ <T$_B$ .

19. The light modulation element according to claim 1, wherein L$^1$, L$^2$ and L$^3$ are selected from F, CN, CH$_3$, C$_2$H$_5$, OCH$_3$, COCH$_3$, CF$_3$ and OCF$_3$.

* * * * *